United States Patent
Nakamura

(10) Patent No.: US 9,244,259 B2
(45) Date of Patent: Jan. 26, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Tomoyuki Nakamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 13/957,638

(22) Filed: Aug. 2, 2013

(65) Prior Publication Data

US 2014/0049673 A1    Feb. 20, 2014

(30) Foreign Application Priority Data

Aug. 17, 2012    (JP) ................. 2012-180899

(51) Int. Cl.
  *H04N 5/262* (2006.01)
  *G02B 15/163* (2006.01)
  *G02B 15/14* (2006.01)
  *G02B 15/173* (2006.01)

(52) U.S. Cl.
  CPC .............. *G02B 15/14* (2013.01); *G02B 15/173* (2013.01)

(58) Field of Classification Search
  CPC .... G02B 15/173; G02B 15/177; G02B 15/14; G02B 13/0045; H04N 5/23296; H04N 5/2254; H04N 5/2253; H04N 5/23287
  USPC ................. 348/240.99, 240.3, 360, 374–375; 356/714, 745–746, 753, 763, 769
  See application file for complete search history.

(56) References Cited

U.S. PATENT DOCUMENTS

| 4,560,254 A | 12/1985 | Doi et al. |
| 5,561,560 A | 10/1996 | Tsutsumi |
| 2005/0122595 A1* | 6/2005 | Nurishi ............... 359/684 |
| 2007/0223108 A1 | 9/2007 | Iijima |
| 2009/0128923 A1 | 5/2009 | Toyama |

FOREIGN PATENT DOCUMENTS

| EP | 2 175 300 A1 | 4/2010 |
| JP | 07248449 A | 9/1995 |
| JP | 2004-117827 A | 4/2004 |
| JP | 2009128491 A | 6/2009 |
| JP | 2009128492 A | 6/2009 |

OTHER PUBLICATIONS

Extended European Search Report for corresponding EP 13004037.1, mail date Jul. 2, 2014.

* cited by examiner

*Primary Examiner* — Twyler Haskins
*Assistant Examiner* — Carramah J Quiett
(74) *Attorney, Agent, or Firm* — Rossi, Kimms & McDowell LLP

(57) ABSTRACT

A zoom lens includes, in order from an object side: a first positive lens unit not moving for zooming; a second negative lens unit moving during zooming; a third positive lens unit moving during zooming; a fourth positive lens unit moving during zooming; and a fifth positive lens unit not moving for zooming. Each of the lens units includes positive and negative lenses, and satisfies $10<\nu p-\nu n<54$, $-1<\beta 2w<-0.05$, $-5<\beta 2t<-1$, and $-1<\beta 34z2<-0.3$, where $\nu p$ is average Abbe constant of the positive lens of the fourth unit, $\nu n$ an average Abbe constant of the negative lens of the fourth unit, $\beta 2w$ a magnification of the second unit at wide angle end, $\beta 2t$ a magnification of the second unit at telephoto end, and $\beta 34z2$ a magnification of a combined lens unit including the third and fourth unit at a zoom position where the magnification of the second unit is $-1$.

10 Claims, 23 Drawing Sheets

MOST-PERIPHERAL OFF-AXIAL MARGINAL RAY

AXIAL MARGINAL RAY

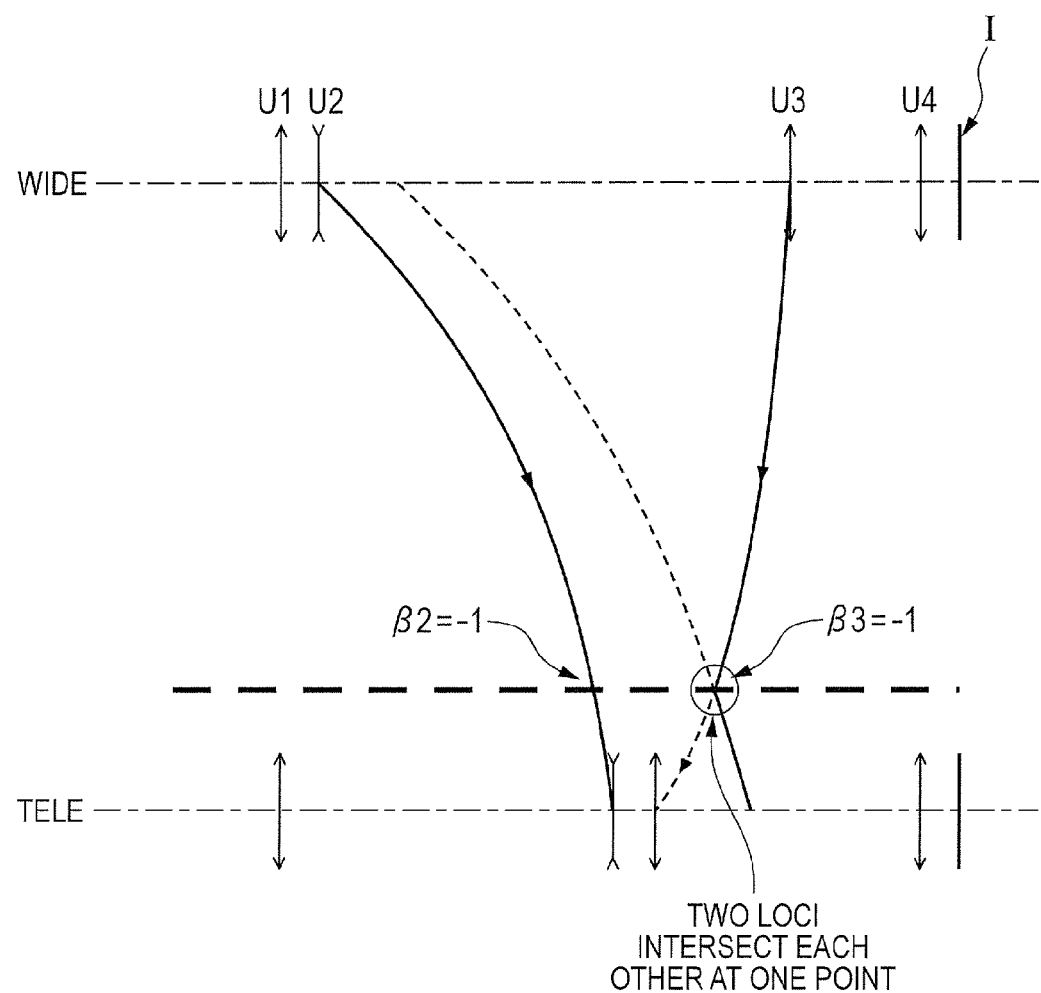

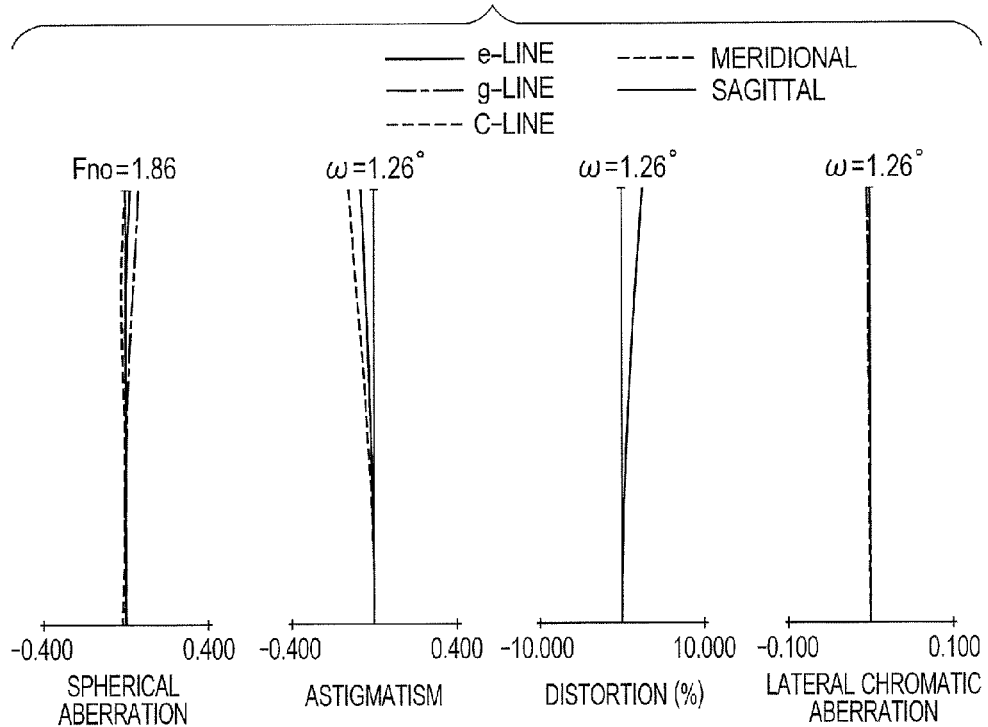
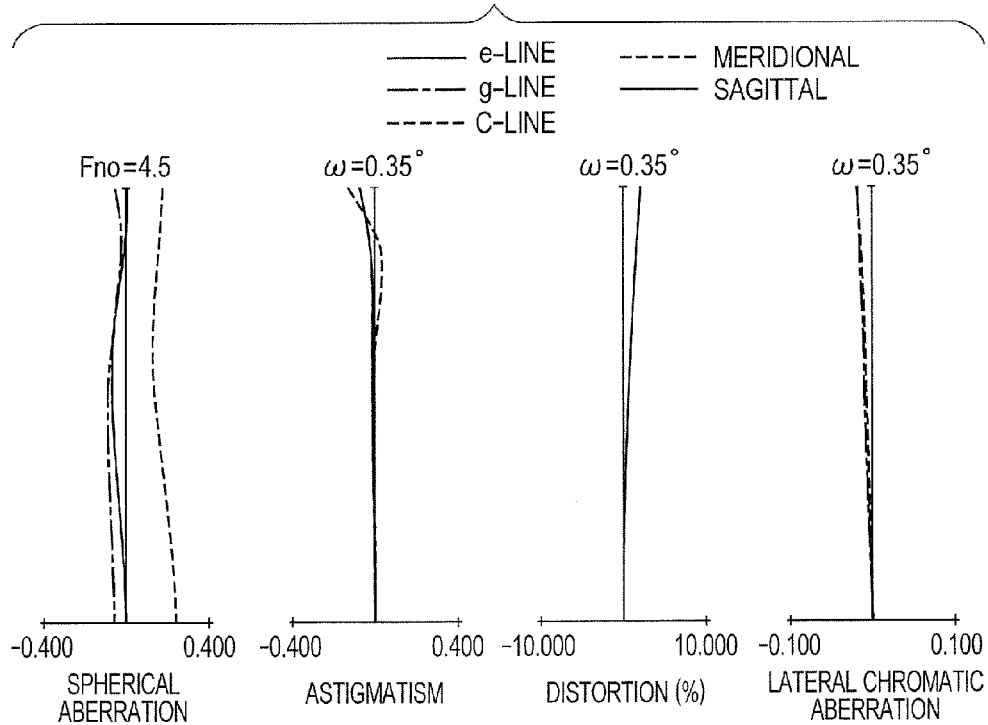

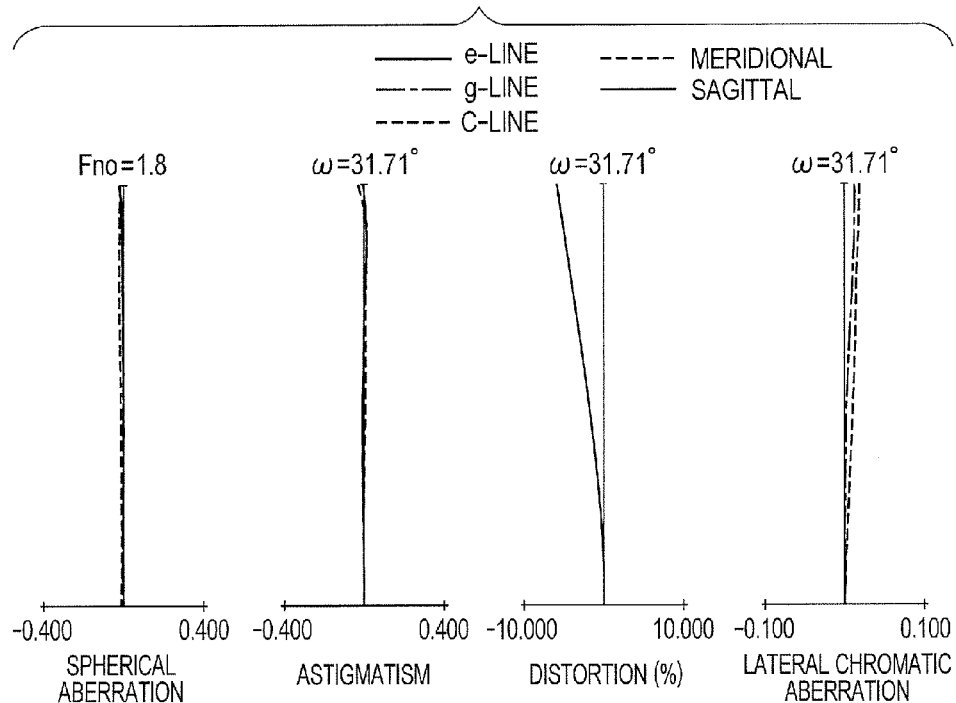
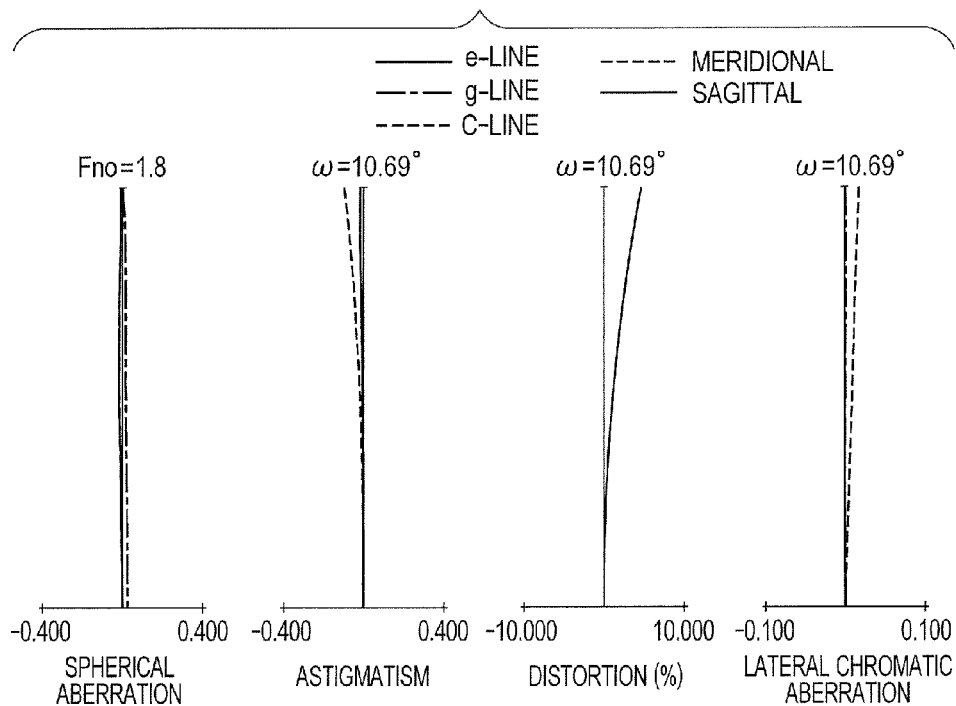

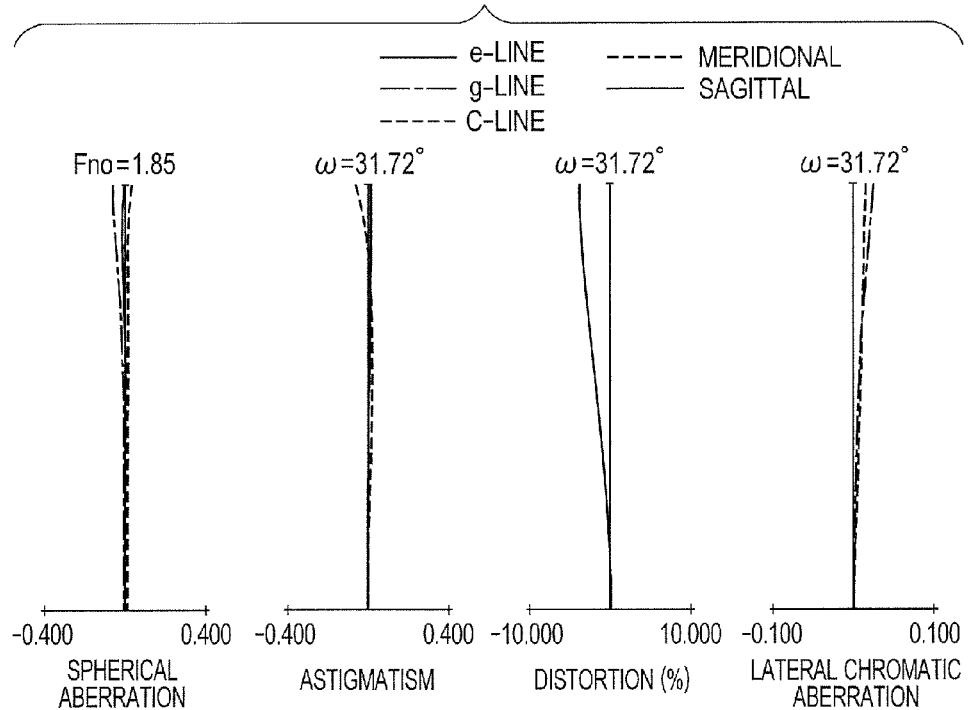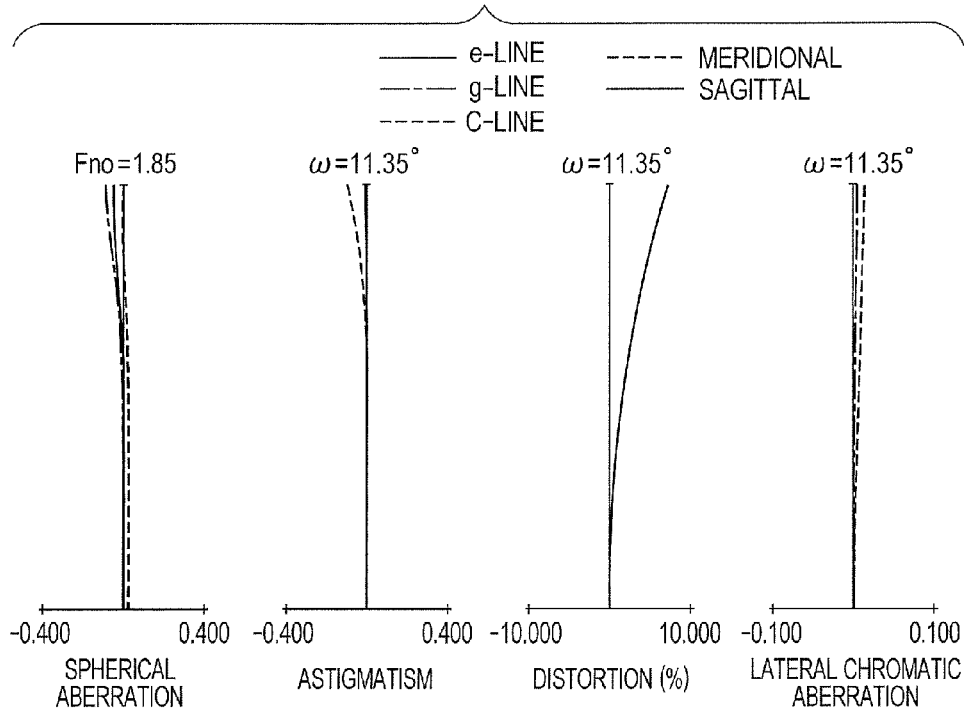

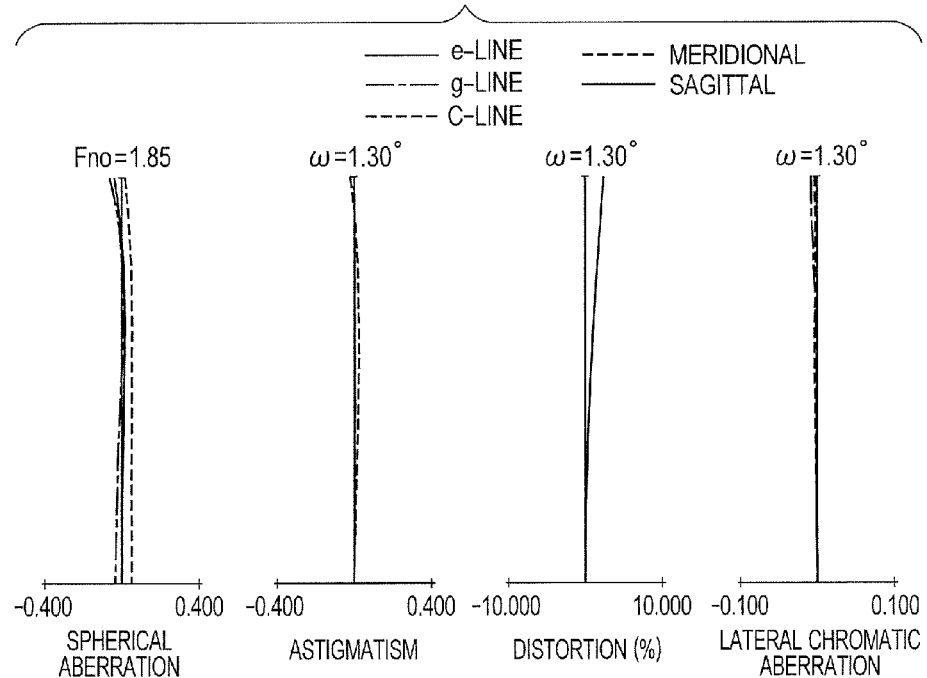
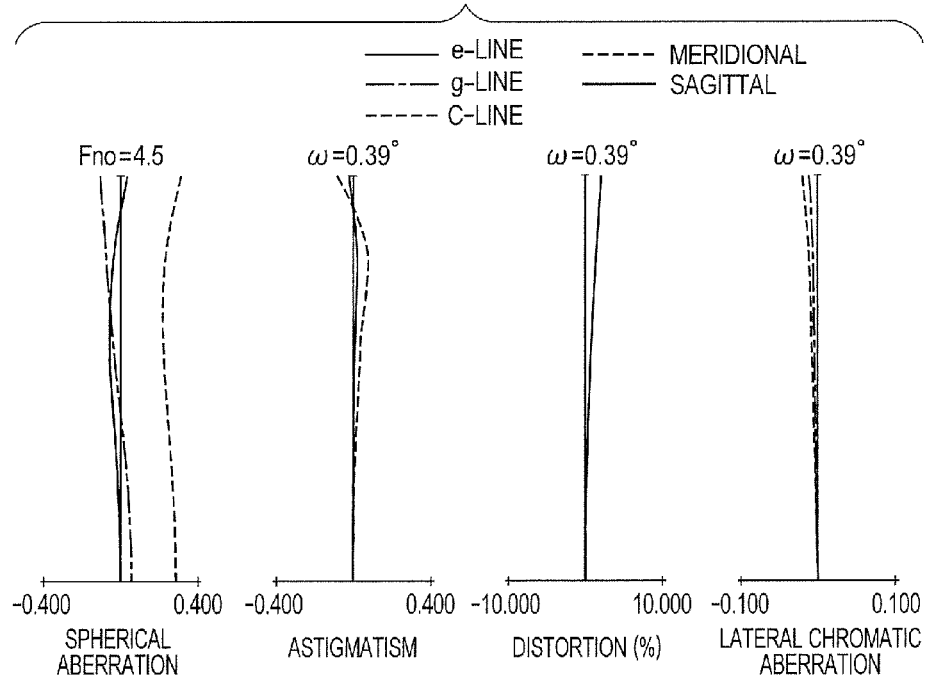

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, which are suitable for use in a broadcasting television camera, a video camera, a digital still camera, a monitoring camera, and a silver-halide film camera.

2. Description of the Related Art

In recent years, there have been demanded a zoom lens having a wide angle of field, a high zoom ratio, and high optical performance for image pickup apparatus such as a television camera, a silver-halide film camera, a digital camera, and a video camera. As the zoom lens having the wide angle of field and the high zoom ratio, there has been known a positive-lead type five-unit zoom lens including five lens units in which a lens unit having a positive refractive power is arranged at the end on an object side.

As the positive-lead type zoom lens, there has been known a five-unit zoom lens in which three movable lens units including a second lens unit having a negative refractive power, a third lens unit having the positive refractive power, and a fourth lens unit having the positive refractive power vary magnification and correct an image plane variation accompanying zooming (Japanese Patent Application Laid-Open Nos. H07-248449, 2009-128491, and 2009-128492).

Japanese Patent Application Laid-Open No. H07-248449 discloses a zoom lens having a zoom ratio of about 17 and a photographing angle of field at a wide angle end of about 70°. Japanese Patent Application Laid-Open Nos. 2009-128491 and 2009-128492 each disclose a zoom lens having a zoom ratio of about 54 and a photographing angle of field at a wide angle end of about 60°.

In the five-unit zoom lens, in order to obtain high optical performance while maintaining an increased angle of field and an increased zoom ratio, it is important to appropriately set a refractive power arrangement, configuration, and the like of each lens unit. It is especially important to appropriately set a refractive power, a moving condition during zooming, and the like of each of the second, third, and fourth lens units as zooming lens units. Additionally, it is important to select glass materials and shapes of the fourth lens unit and appropriately set a combined refractive power of the third and fourth lens units, loci of movement of the third and fourth lens units from the wide angle end to a telephoto end, and the like. Unless the configurations are appropriately set, it becomes difficult to obtain the zoom lens having the high optical performance over the entire zoom range with the wide angle of field and the high zoom ratio.

In the zoom lens disclosed in each of Japanese Patent Application Laid-Open Nos. H07-248449, 2009-128491, and 2009-128492, the refractive powers and the loci of movement of the zooming lens units are defined so that an imaging magnification of a combined lens unit including the third and fourth lens units is always −1 when an imaging magnification of the second lens unit is −1 at a predetermined middle zoom position. Moreover, one of the third and fourth lens units includes only positive lenses, and when the loci of movement during zooming are set in order to suppress an increase in effective diameter accompanying further increases in angle of field and zoom ratio, variations in aberrations accompanying the zooming have tended to increase.

The high zoom ratio is a zoom ratio of about 20 to 35 when the angle of field at the wide angle end is about 75° to 85°, or a zoom ratio of about 80 to 130 when the angle of field at the wide angle end is 60° to 67°.

SUMMARY OF THE INVENTION

The present invention provides a zoom lens having a wide angle of field and a high zoom ratio as well as high optical performance over the entire zoom range and providing a fine zoom operation, and an image pickup apparatus including the zoom lens.

A zoom lens according to one embodiment of the present invention includes, in order from an object side to an image side: a first lens unit having a positive refractive power which does not move for zooming; a second lens unit having a negative refractive power which moves during zooming; a third lens unit having the positive refractive power which moves during zooming; a fourth lens unit having the positive refractive power which moves during zooming; and a fifth lens unit having the positive refractive power which does not move for zooming, in which each of the first lens unit to the fifth lens unit includes at least one positive lens and at least one negative lens, and in which the following conditional expressions are satisfied:

$$-10 < \nu p - \nu n < 54;$$

$$-1 < \beta 2w < -0.05;$$

$$-5 < \beta 2t < -1;$$

and $$-1 < \beta 34z2 < -0.3,$$

where $\nu p$ is an average Abbe constant of the at least one positive lens of the fourth lens unit, $\nu n$ is an average Abbe constant of the at least one negative lens of the fourth lens unit, $\beta 2w$ is an imaging magnification of the second lens unit at a wide angle end, $\beta 2t$ is an imaging magnification of the second lens unit at a telephoto end, and $\beta 34z2$ is an imaging magnification of a combined lens unit including the third lens unit and the fourth lens unit at a zoom position z2 where the imaging magnification of the second lens unit is −1.

According to the present invention, it is possible to provide the zoom lens having a wide angle of view, a high zoom ratio, and high optical performance over the entire zoom range, and the image pickup apparatus including the zoom lens.

Further features of the present invention will become apparent from the following description of exemplary embodiments with reference to the attached drawings.

BRIEF DESCRIPTION OF THE DRAWINGS

FIG. 3 is a schematic diagram of a paraxial refractive power arrangement of a transition type zoom lens.

FIG. 10C is an aberration diagram when focused on the object at infinity at the zoom position z2 according to Numerical Embodiment 2.

FIG. 10D is an aberration diagram when focused on the object at infinity at the telephoto end according to Numerical Embodiment 2.

FIG. 12A is an aberration diagram when focused on the object at infinity at the wide angle end according to Numerical Embodiment 3.

FIG. 12B is an aberration diagram when focused on the object at infinity at the zoom position z1 according to Numerical Embodiment 3.

FIG. 18A is an aberration diagram when focused on the object at infinity at the wide angle end according to Numerical Embodiment 6.

FIG. 18B is an aberration diagram when focused on the object at infinity at the zoom position z1 according to Numerical Embodiment 6.

FIG. 18C is an aberration diagram when focused on the object at infinity at the zoom position z2 according to Numerical Embodiment 6.

FIG. 18D is an aberration diagram when focused on the object at infinity at the telephoto end according to Numerical Embodiment 6.

DESCRIPTION OF THE EMBODIMENTS

In the following, an embodiment of the present invention is described in detail with reference to the attached drawings. A zoom lens according to the present invention includes, in order from an object side to an image side, a first lens unit (front lens unit) U1 having a positive refractive power which does not move for zooming, a second lens unit U2 having a negative refractive power which moves during zooming, a third lens unit U3 having a positive refractive power which moves during zooming, a fourth lens unit U4 which moves during zooming, and a fifth lens unit (relay lens unit) U5 having a positive refractive power which does not move for zooming.

The expression that "a lens unit does not move for zooming" means herein that the lens unit is not driven for a purpose of zooming, but the lens unit may move for focusing if zooming and focusing are performed simultaneously.

Figure 1:
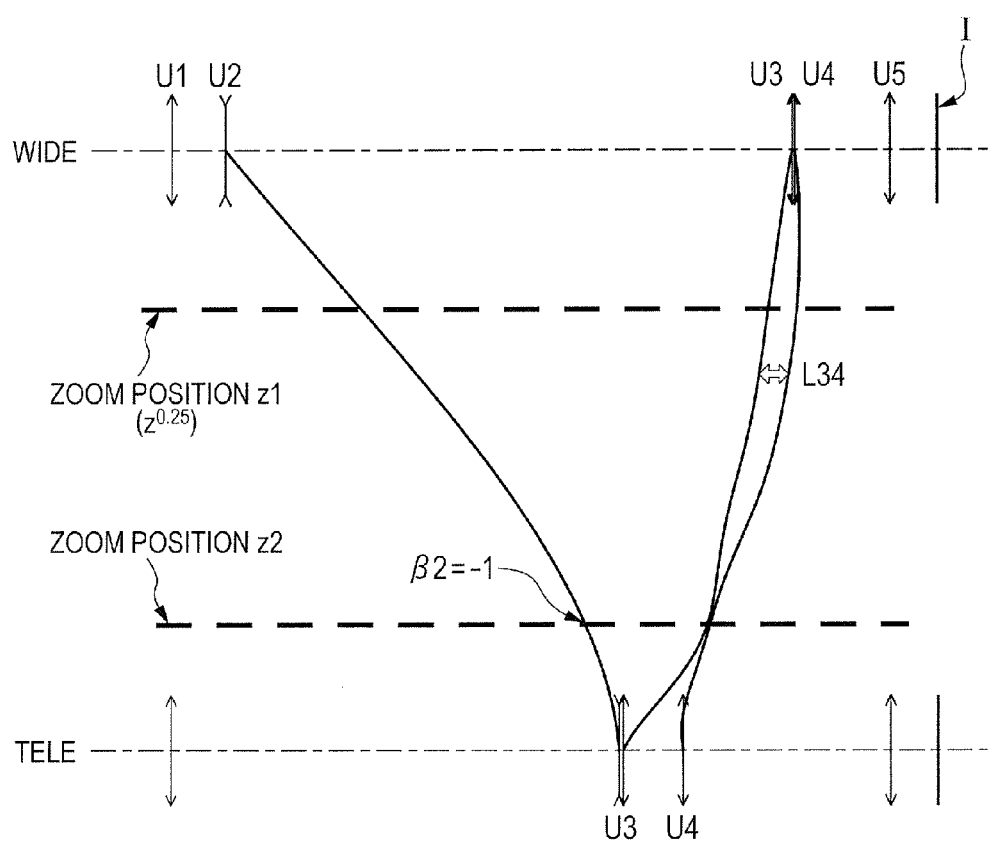
FIG. 1 is a schematic diagram of a paraxial refractive power arrangement of a zoom lens according to Embodiment 1 of the present invention.

FIG. 1 is a schematic diagram of a paraxial refractive power arrangement of a zoom lens according to Embodiment 1 (Numerical Embodiment 1) of the present invention, which is to be described later, and illustrates loci of movement of second to fourth lens units U2 to U4 during zooming. In the figure, the upper part is a wide angle end (WIDE) and the lower part is a telephoto end (TELE). The solid lines connecting from the upper part to the lower part represent the loci of the lens units which move during zooming. In FIG. 1, the third lens unit U3 and the fourth lens unit U4 move so that an interval L34 is large near a zoom position z1 and the interval L34 is small near a zoom position z2 where an imaging magnification of the second lens unit U2 becomes −1.

Figure 2A:
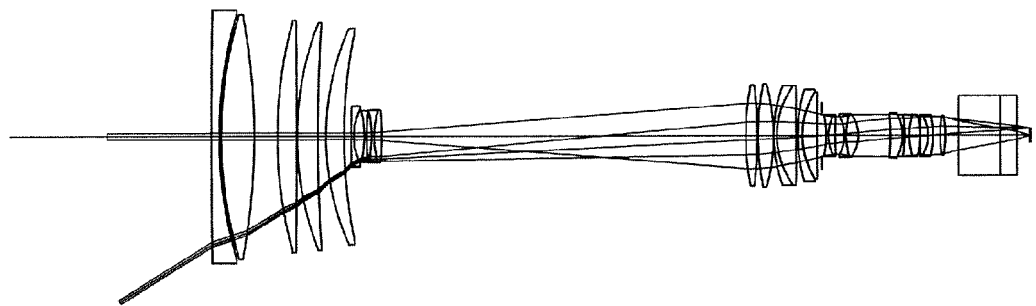
FIGS. 2A, 2B, 2C and 2D are optical path diagrams at a wide angle end, a zoom position z1, a zoom position z2, and a telephoto end.
Figure 2B:
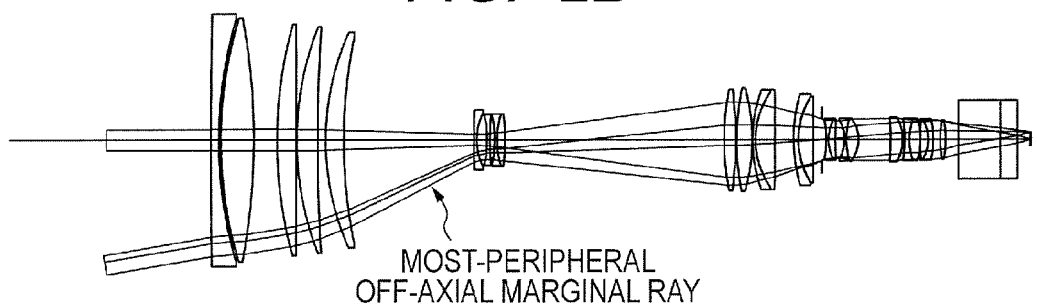
Figure 2C:
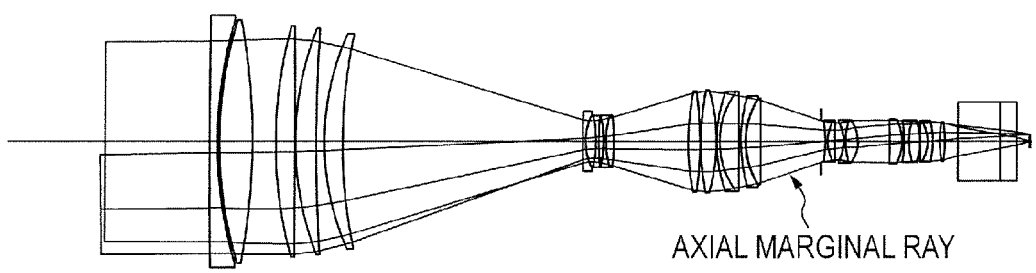
Figure 2D:
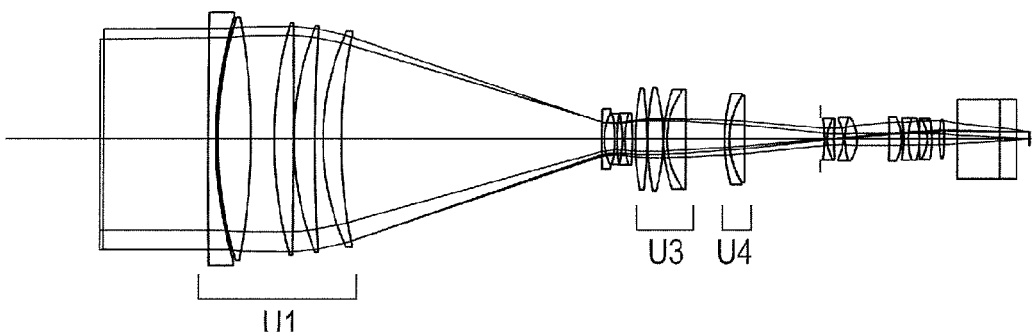

FIGS. 2A to 2D are optical path diagrams from the wide angle end to the telephoto end according to the present invention, and are optical path diagrams at the wide angle end, the zoom position z1, the zoom position z2, and the telephoto end, respectively. As light beams, two light beams including an axial light beam and an off-axial light beam, which corresponds to the most periphery of the screen, are illustrated. As illustrated in FIG. 2B, the most-peripheral off-axial marginal ray passes through a position higher than that at the wide angle end with respect to the first lens unit U1, and passes through the highest position near z1. Further, as illustrated in FIG. 2C, the axial marginal ray passes through the highest position near z2 with respect to the third lens unit U3 and the fourth lens unit U4.

In other words, a lens diameter of the first lens unit U1 is determined near z1, and lens diameters of the third lens unit U3 and the fourth lens unit U4 are determined near z2.

In addition, FIG. 3 illustrates a paraxial schematic diagram of a four-unit zoom lens generally called a transition type that is a zoom lens advantageous for increasing a zoom ratio. The transition type zoom lens includes a first lens unit U1 having a positive refractive power, a second lens unit U2 having a negative refractive power which moves during zooming, a third lens unit U3 having a positive refractive power which moves during zooming, and a fourth lens unit U4 having a positive refractive power for imaging. In FIG. 3, the upper part is the wide angle end (WIDE), and the lower part is the telephoto end (TELE). The solid lines connecting from the upper part to the lower part represent loci of the second lens unit U2 and the third lens unit U3 when the second lens unit U2 and the third lens unit U3 move during zooming. The transition type zoom lens satisfies a condition that when the lateral magnification $\beta 2$ of the second lens unit U2 is −1, the lateral magnification $\beta 3$ of the third lens unit U3 becomes −1. Thus, the third lens unit U3 can continue to move in one way from the image side (the right side) to the object side (the left side) during zooming. As a result, a variation of $\beta 3$ during zooming can be increased, which is advantageous for increasing a zoom ratio.

Figure 4:
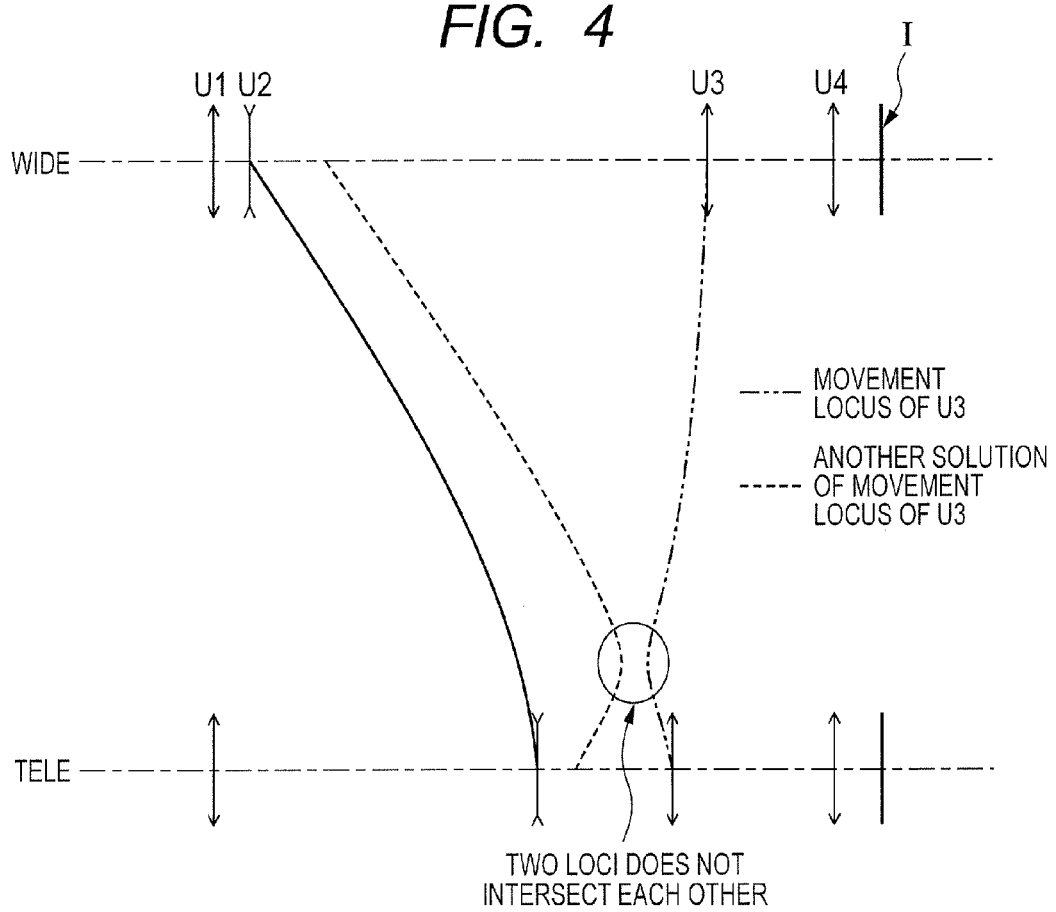
FIG. 4 is a schematic diagram of a paraxial refractive power of a four-unit zoom lens.

Note that, FIG. 4 illustrates a paraxial schematic diagram of an ordinary four-unit zoom lens that does not satisfy this condition. As illustrated in FIG. 4, in the four-unit zoom lens, the third lens unit U3 that generally corrects the image point can move along two loci of movement represented by a dashed double-dotted line and a broken line. The transition type zoom lens illustrated in FIG. 3 is a special case of FIG. 4. When the above-mentioned condition is satisfied, the two loci of movement intersect each other at one point so that it is possible to transfer from one of the two loci of movement to the other locus of movement at the intersection.

In the zoom lens according to the present invention, each of the first lens unit to the fifth lens unit U1 to U5 includes at least one positive lens and at least one negative lens. In this case, the following conditional expressions are satisfied:

$$10 < \nu p - \nu n < 54 \quad (1);$$

$$-1 < \beta 2w < -0.05 \quad (2);$$

$$-5 < \beta 2t < -1 \quad (3);$$

and $$-1 < \beta 34z2 < -0.3 \quad (4),$$

where $\nu p$ is an average Abbe constant of the positive lens of the fourth lens unit, $\nu n$ is an average Abbe constant of the negative lens of the fourth lens unit, $\beta 2w$ is an imaging magnification of the second lens unit at the wide angle end, $\beta 2t$ is an imaging magnification of the second lens unit at the telephoto end, and $\beta 34z2$ is an imaging magnification of a combined lens unit including the third lens unit and the fourth lens unit at the zoom position z2 where the imaging magnification of the second lens unit is −1.

Conditional Expression (1) is a condition for appropriately correcting variations in axial chromatic aberration and lateral chromatic aberration caused by zooming at a middle zoom position. In the zoom lens according to the present invention, a lens configuration and dispersion characteristics of lens materials of the fourth lens unit U4 are important factors in correcting the variations in axial chromatic aberration and lateral chromatic aberration caused by the zooming at the middle zoom position satisfactorily. Conditional Expression (1) is satisfied so that the interval between the third lens unit U3 and the fourth lens unit U4 at the middle zoom position is large, and so that the variations in axial chromatic aberration and lateral chromatic aberration caused by the zooming may be corrected satisfactorily even when the interval is small.

When the upper limit condition of Conditional Expression (1) is not satisfied, chromatic aberrations within the fourth lens unit U4 are overcorrected, which makes it difficult to correct the axial chromatic aberration and the lateral chromatic aberration at the middle zoom position. When the lower limit condition of Conditional Expression (1) is not satisfied, the chromatic aberrations within the fourth lens unit U4 are undercorrected, which makes it difficult to correct the axial chromatic aberration and the lateral chromatic aberration at the middle zoom position and to correct a secondary spectrum of an axial chromatic aberration at the telephoto end.

Figure 5:
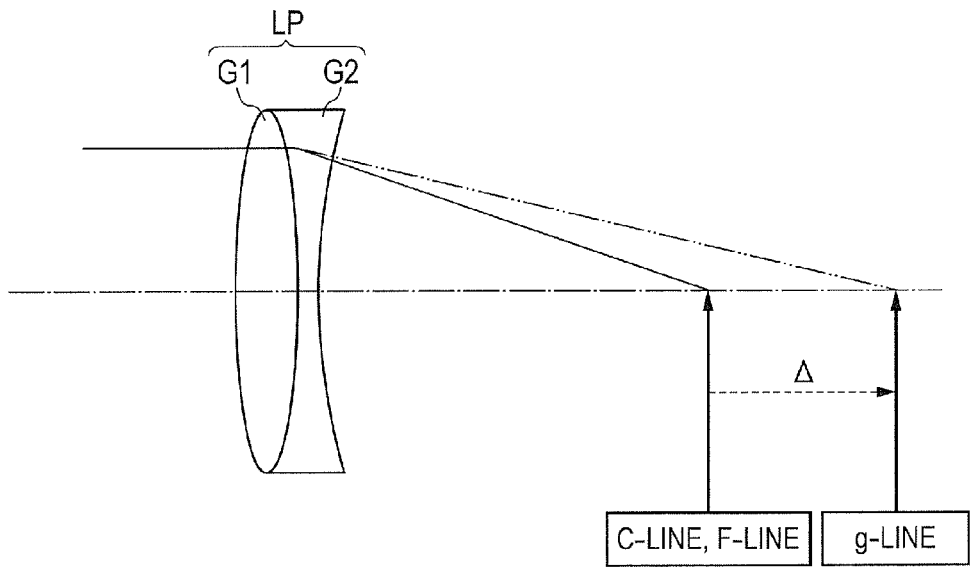
FIG. 5 is a diagram of two-color achromatism and a remaining secondary spectrum of a positive lens unit.
Figure 6:
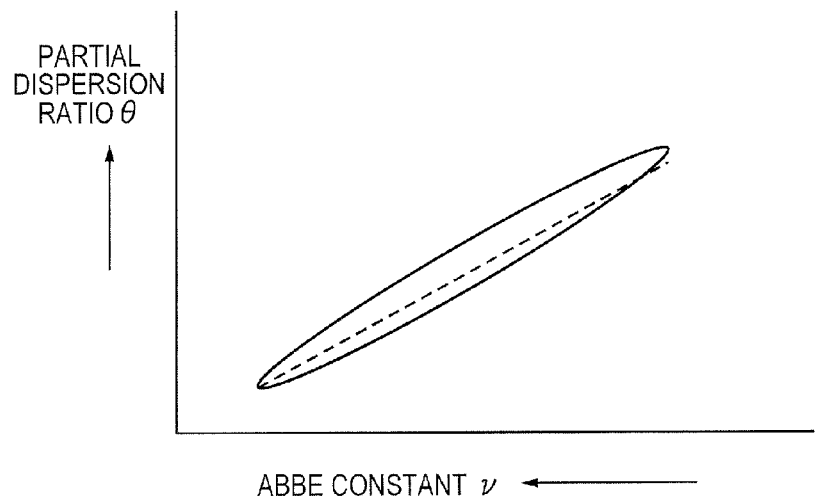
FIG. 6 is a graph of a distribution of Abbe constants ν and partial dispersion ratios θ of optical materials.

FIG. 5 is a schematic diagram of two-color achromatism and a remaining secondary spectrum of a lens unit LP having a positive refractive power. FIG. 6 is a graph of a distribution of Abbe constants $\nu$ and partial dispersion ratios $\theta$ of existing optical materials. Here, the Abbe constants $\nu$ and the partial dispersion ratios $\theta$ are respectively expressed by the following expressions:

$$\nu = (Nd-1)/(NF-NC) \quad (i)$$

$$\theta = (Ng-NF)/(NF-NC) \quad (ii)$$

where Ng is a refractive index at the g-line, NF is a refractive index at the F-line, Nd is a refractive index at the d-line, and NC is a refractive index at the C-line. As shown in FIG. 6, the existing optical materials are distributed in the region having a narrow partial dispersion ratio $\theta$ with respect to the Abbe constant $\nu$, and there is a tendency that the partial dispersion ratio $\theta$ increases as the Abbe constant $\nu$ decreases.

A correction condition of chromatic aberrations of a thin lens system including two lenses G1 and G2 having refractive powers $\phi 1$ and $\phi 2$ and Abbe constants of materials $\nu 1$ and $\nu 2$, respectively (combined refractive power $\phi$) is expressed by the following expression.

$$\phi 1/\nu 1 + \phi 2/\nu 2 = E \quad (iii)$$

Here, $\phi$ is expressed as follows.

$$\phi = \phi 1 + \phi 2 \quad (iv)$$

If E=0 is satisfied in the expression (iii), an imaging position is identical between the C-line and the F-line. In a middle zoom range in which a focal length is short and the secondary spectrum is not large, the chromatic aberrations may be corrected when E=0 is satisfied.

In order to correct the variations in chromatic aberrations at the middle zoom position, it is preferred to set glass materials used for the fourth lens unit U4 so as to satisfy Conditional Expression (1), and it is more preferred to set the glass materials as follows:

$$20 < \nu p - \nu n < 49 \quad (1a).$$

Conditional Expression (2) defines a lateral magnification of the second lens unit U2 at the wide angle end. When the upper limit condition of Conditional Expression (2) is not satisfied, an interval between the first lens unit U1 and the second lens unit U2 becomes too large, which increases the entire length of the lens. Alternatively, a refractive power of the second lens unit U2 becomes too large, which increases the variations in aberrations accompanying the zooming. When the lower limit condition of Conditional Expression (2) is not satisfied, it becomes difficult to secure intervals among the second to fourth lens units U2 to U4 at the telephoto end, which is unsuitable for a high zoom ratio.

Conditional Expression (3) defines a lateral magnification of the second lens unit U2 at the telephoto end. When the upper limit condition of Conditional Expression (3) is not satisfied, in order to increase the zoom ratio, an amount of movement of the second lens unit U2 needs to be increased, which increases the entire length of the lens. When the lower limit condition of Conditional Expression (3) is not satisfied, it becomes difficult to secure the intervals among the second to fourth lens units U2 to U4 at the telephoto end, which is unsuitable for the high zoom ratio.

In order to attain the increase in zoom ratio, it is preferred to satisfy Conditional Expressions (2) and (3) and set the imaging magnification of the second lens unit U2 so as to pass a point of −1 during zooming.

Conditional Expression (4) defines the imaging magnification of the combined lens unit including the third and fourth lens units U3 and U4 at the zoom position z2 where the imaging magnification of the second lens unit U2 is −1. Conditional Expression (4) is satisfied so that the lens diameters of the third and fourth lens units U3 and U4 may be reduced as compared to those of the transition type zoom lens illustrated in FIG. 3.

When the upper limit condition of Conditional Expression (4) is not satisfied, the imaging magnification of the combined lens unit is too large, which is unsuitable for increasing the zoom ratio. When the lower limit condition of Conditional Expression (4) is not satisfied, the imaging magnification of the combined lens unit is too small, which results in increased lens diameters of the third and fourth lens units U3 and U4 than those of the transition type zoom lens.

It is more preferred to set numerical ranges of Conditional Expressions (2) to (4) as follows:

$$-0.2 < \beta w < -0.05 \quad (2a);$$

$$-4.5 < \beta 2t < -1.5 \quad (3a);$$

and $$-0.96 < \beta 34z2 < -0.5 \quad (4a).$$

By satisfying the above conditions, the present invention provides a small and lightweight zoom lens in which the aberrations are corrected satisfactorily over the entire zoom range.

It is further preferred that the third lens unit U3 pass through the point where the imaging magnification is −1 during zooming from the wide angle end to the telephoto end. With this configuration, a change in lateral magnification of the third lens unit U3 becomes large to facilitate the increase in zoom ratio.

It is further preferred to satisfy the following condition:

$$0.1 < f3/f4 < 1.0 \quad (5),$$

where f3 is a focal length of the third lens unit, and f4 is a focal length of the fourth lens unit.

Conditional Expression (5) defines a ratio of the focal lengths of the third lens unit U3 and the fourth lens unit U4. When the upper limit condition of Conditional Expression (5) is not satisfied, the focal length of the third lens unit U3 becomes too short, which makes efficient zooming difficult and increases the entire length of the lens. When the lower limit condition of Conditional Expression (5) is not satisfied, the focal length of the fourth lens unit U4 becomes relatively too short, which makes it difficult to reduce the lens diameter.

It is further preferred to satisfy the following condition:

$$0.5 < (R41+R42)/(R41-R42) < 10 \quad (6),$$

where R41 is a radius of curvature of a surface on the object side and R42 is a radius of curvature of a surface on the image side of a negative lens at the end on the object side of the fourth lens unit U4.

Conditional Expression (6) is an expression generally called a shape factor, and defines a shape of the negative lens at the end on the object side of the fourth lens unit U4. When the upper limit condition of Conditional Expression (6) is not satisfied, a refractive power of the negative lens becomes too small to reduce the effect of correcting the aberrations. Workability is also poor. When the lower limit condition of Conditional Expression (6) is not satisfied, an angle is formed with a light beam that enters the negative lens, which causes the aberrations and leads to an increase in number of constituent lenses of the lens unit.

It is further preferred to satisfy the following condition:

$$-5.5 \times 10^{-3} < (\theta 2p - \theta 2n)/(v2p - v2n) < -2.0 \times 10^{-3} \quad (7),$$

where v2p and θ2p are average values of an Abbe constant v and a partial dispersion ratio θ of the at least one positive lens of the second lens unit U2, respectively, and v2n and θ2n are average values of an Abbe constant v and a partial dispersion ratio θ of the at least one negative lens of the second lens unit U2, respectively.

Conditional Expression (7) is a condition for appropriately correcting the secondary spectrum of the axial chromatic aberration especially at the telephoto end. When the upper limit condition of Conditional Expression (7) is not satisfied, the effect of correcting the secondary spectrum of the axial chromatic aberration at the telephoto end is small to cause undercorrection. When the lower limit condition of Conditional Expression (7) is not satisfied, the secondary spectrum of the lateral chromatic aberration at the wide angle end is increased.

In FIG. 5, for achromatism of the lens unit LP having the positive refractive power, the material having the large Abbe constant v1 is used as the positive lens G1, and the material having the small Abbe constant v2 is used as the negative lens G2. Therefore, as can be seen from FIG. 6, the positive lens G1 has a small partial dispersion ratio θ1 and the negative lens has a large partial dispersion ratio θ2, and when the chromatic aberrations are corrected for the F-line and the C-line, an imaging point of the g-line is shifted to the image side. This amount of shift when defined as a secondary spectrum amount Δ is expressed as:

$$\Delta = -(1/\phi) \cdot (\theta 1 - \theta 2)/(v1 - v2) \quad (v).$$

In the case of the positive lens, the g-line remains closer to the image plane side as illustrated in FIG. 5, and in the case of the negative lens, the g-line remains on the object side. Therefore, through selection of a glass material that reduces A for the positive lens and a glass material that increases A for the negative lens, the secondary spectrum may be corrected.

It is further preferred to satisfy at least one of the following conditions:

$$-2.5 \times 10^{-3} < (\theta 3p - \theta 3n)/(v3p - v3n) < -2.0 \times 10^{-4} \quad (8),$$

$$-3.5 \times 10^{-3} < (\theta 4p - \theta 4n)/(v4p - v4n) < -5.0 \times 10^{-4} \quad (9),$$

where v3p and θ3p are average values of an Abbe constant v and a partial dispersion ratio θ of the at least one positive lens of the third lens unit U3, respectively, and v3n and θ3n are average values of an Abbe constant v and a partial dispersion ratio θ of the at least one negative lens of the third lens unit U3, respectively. Similarly, ν4p and θ4p are average values of an Abbe constant ν and a partial dispersion ratio θ of the at least one positive lens of the fourth lens unit U4, respectively, and ν4n and θ4n are average values of an Abbe constant ν and a partial dispersion ratio θ of the at least one negative lens of the fourth lens unit U4, respectively.

Conditional Expressions (8) and (9) are conditions for appropriately correcting the secondary spectrum of the axial chromatic aberration especially at the telephoto end.

When the upper limit condition of Conditional Expression (8) is not satisfied, it becomes difficult to suppress the variation in lateral chromatic aberration on the wide angle side. When the lower limit condition of Conditional Expression (8) is not satisfied, the secondary spectrum of the axial chromatic aberration at the telephoto end is increased.

When the upper limit condition of Conditional Expression (9) is not satisfied, a glass material having a small refractivity needs to be selected for the positive lens, which makes the correction of the aberrations difficult. When the lower limit condition of Conditional Expression (9) is not satisfied, the secondary spectrum of the axial chromatic aberration at the telephoto end is increased.

It is further preferred to satisfy the following condition:

$$0.5 < f34w/f34z1 < 1.06 \quad (10),$$

where $f34w$ is a combined focal length of the third lens unit U3 and the fourth lens unit U4 at the wide angle end, and $f34z1$ is a combined focal length of the third lens unit U3 and the fourth lens unit U4 at a zoom position z1, provided that z is a zoom ratio, and z1 is the zoom position having the zoom ratio of $z^{0.25}$.

Conditional Expression (10) defines a ratio of the focal lengths at the wide angle end and the zoom position z1 of the combined lens unit including the third lens unit U3 and the fourth lens unit U4.

When the upper limit condition of Conditional Expression (10) is not satisfied, a lens interval between the third lens unit U3 and the fourth lens unit U4 at the zoom position z1 becomes too large, which makes it difficult to reduce the entire length of the lens. When the lower limit condition of Conditional Expression (10) is not satisfied, the lens interval between the third lens unit U3 and the fourth lens unit U4 at the zoom position z1 is smaller than that at the wide angle end, which leads to an increased lens diameter of the first lens unit U1.

When a focal length of one of two lens units is represented by fa, a focal length of the other is represented by fb, and a principal point interval between the two lens units is represented by e, a combined focal length F of the two lens units may generally be expressed by the following expression:

$$1/F = 1/fa + 1/fb - e/(fa \times fb) \quad (vi).$$

Therefore, through an increase or decrease of the principal point interval e between the two lens units, the focal length of the combined lens unit may be changed arbitrarily. Both the third and fourth lens units U3 and U4 of the present invention are positive lenses so that when the interval is increased, the focal length of the combined lens unit is increased, and when the interval is reduced, the focal length of the combined lens unit is reduced.

It is further preferred to satisfy at least one of the following conditions:

$$1.5 < |ft/f1| < 5.0 \quad (11);$$

and $$3.0 < |f1/f2| < 15.0 \quad (12),$$

where f1 is a focal length of the first lens unit U1, f2 is a focal length of the second lens unit U2, and ft is a focal length at the telephoto end.

Conditional Expression (11) defines a ratio of the focal length at the telephoto end and the focal length of the first lens unit U1. When the upper limit condition of Conditional Expression (11) is not satisfied, a magnification of the first lens unit U1 at the telephoto end becomes too large, which makes it difficult to correct a variation in spherical aberration and the axial chromatic aberration on the telephoto side. When the lower limit condition of Conditional Expression (11) is not satisfied, the focal lengths of the second to fourth lens units U2 to U4 tend to be reduced, which makes it difficult to suppress the variations in aberrations caused by the zooming.

Conditional Expression (12) defines a ratio of the focal length f1 of the first lens unit U1 and the focal length f2 of the second lens unit U2. When the upper limit condition of Conditional Expression (12) is not satisfied, the focal length of the first lens unit U1 becomes relatively long, which increases the lens diameter of the first lens unit U1 and makes it difficult to increase the angle of field. When the lower limit condition of Conditional Expression (12) is not satisfied, the focal length of the first lens unit U1 becomes relatively short, which makes it difficult to correct the variation in spherical aberration and the axial chromatic aberration on the telephoto side.

It is further preferred to satisfy the following condition:

$$2.0 < \beta 2wt/\beta 34wt < 7.0 \quad (13),$$

where $\beta 2wt$ is a ratio of the lateral magnifications at the wide angle end and the telephoto end of the second lens unit U2, and $\beta 34wt$ is a ratio of lateral magnifications at the wide angle end and the telephoto end of the combined lens unit including the third lens unit U3 and the fourth lens unit U4.

Conditional Expression (13) defines a ratio of the ratio of the lateral magnifications at the wide angle end and the telephoto end of the second lens unit U2 and the ratio of combined lateral magnifications at the wide angle end and the telephoto end of the combined lens unit including the third lens unit U3 and the fourth lens unit U4. A product of $\beta 2wt$ and $\beta 34wt$ represents the zoom ratio of the entire lens system, and it can be rephrased that Conditional Expression (13) defines a proportion contributing to the zoom ratio.

When the upper limit condition of Conditional Expression (13) is not satisfied, a proportion in which a combined lens unit U34 contributes to the correction of the aberrations on the telephoto side is small, which makes it difficult to correct the axial chromatic aberration on the telephoto side. When the lower limit condition of Conditional Expression (13) is not satisfied, a share of zooming of the second lens unit U2 becomes small, which makes it difficult to reduce the entire length of the lens and the lens diameters of the third lens unit U3 and the fourth lens unit U4.

It is preferred that at least one surface of the fourth lens unit U4 have an aspherical shape. When applied to a surface having the positive refractive power, it is preferred that the aspherical shape be a shape in which the positive refractive power is reduced from an optical axis to the periphery. When applied to a surface having a negative refractive power, it is preferred that the aspherical shape be a shape in which the negative refractive power is increased from the optical axis to the periphery.

With this configuration, the correction of the variations in aberrations during zooming, especially a spherical aberration, a field curvature, and a coma on the wide angle side is facilitated, which is advantageous in increasing the angle of field.

It is further preferred to set numerical ranges of Conditional Expressions (5) to (13) as follows:

$$0.2 < f3/f4 < 0.7 \tag{5a}$$

$$1.0 < (R41+R42)/(R41-R42) < 7.5 \tag{6a}$$

$$-5.0 \times 10^{-3} < (\theta 2p - \theta 2n)/(\nu 2p - \nu 2n) < -3.5 \times 10^{3} \tag{7a}$$

$$-2.0 \times 10^{-3} < (\theta 3p - \theta 3n)/(\nu 3p - \nu 3n) < -1.0 \times 10^{-3} \tag{8a}$$

$$-2.5 \times 10^{-3} < (\theta 4p - \theta 4n)/(\nu 4p - \nu 4n) < -1.2 \times 10^{3} \tag{9a}$$

$$0.8 < f34w/f34z1 < 1.0 \tag{10a}$$

$$3.0 < |ft/f1| < 4.5 \tag{11a}$$

$$9.3 < |f1/f2| < 13.0 \tag{12a}$$

and $$3.0 < \beta 2wt/\beta 34wt < 6.0 \tag{13a}$$

Features of the lens configuration of the zoom lens of each embodiment of the present invention are now described.

Embodiment 1

A zoom lens according to Embodiment 1 of the present invention includes, in order from the object side, the first lens unit U1 having the positive refractive power which does not move for zooming, the second lens unit U2 having the negative refractive power which moves during zooming, the third lens unit U3 having the positive refractive power which moves during zooming, the fourth lens unit U4 having the positive refractive power which moves during zooming, and the fifth lens unit U5 having the positive refractive power and an imaging action which does not move for zooming. In lens cross-sectional views, the left side represents the subject (object) side (front side), and the right side represents the image side (back side).

The first lens unit U1 includes a focus lens unit U1b, and fixed lens units U1a and U1c which do not move for focusing. The focus lens unit U1b moves toward the object side during focusing from an object at infinity to an object at close distance.

In the zoom lens of each embodiment, the second lens unit U2 to the fourth lens unit U4 move on the optical axis while changing lens intervals thereamong to perform zooming and correct an image plane variation accompanying the zooming. Those three lens units (second lens unit U2 to fourth lens unit U4) constitute a zoom system (zoom unit).

Figure 7:
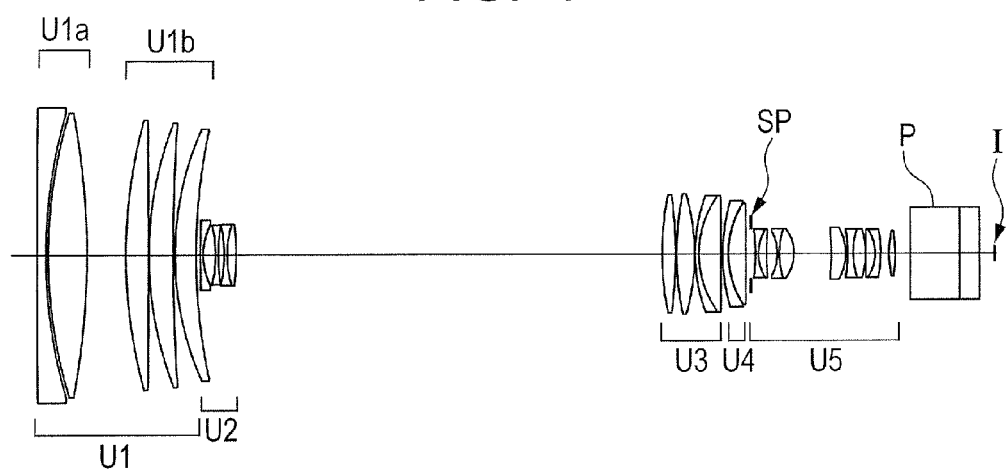
FIG. 7 is a lens cross-sectional view when focused on an object at infinity at the wide angle end according to Numerical Embodiment 1.
Figure 8A:
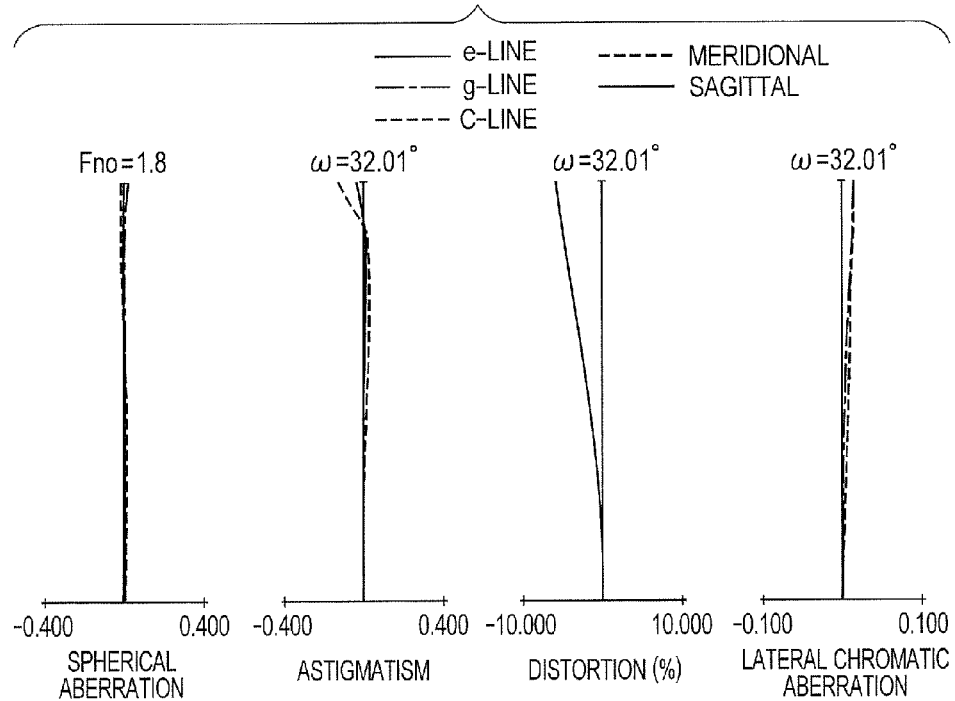
FIG. 8A is an aberration diagram when focused on the object at infinity at the wide angle end according to Numerical Embodiment 1.
Figure 8B:
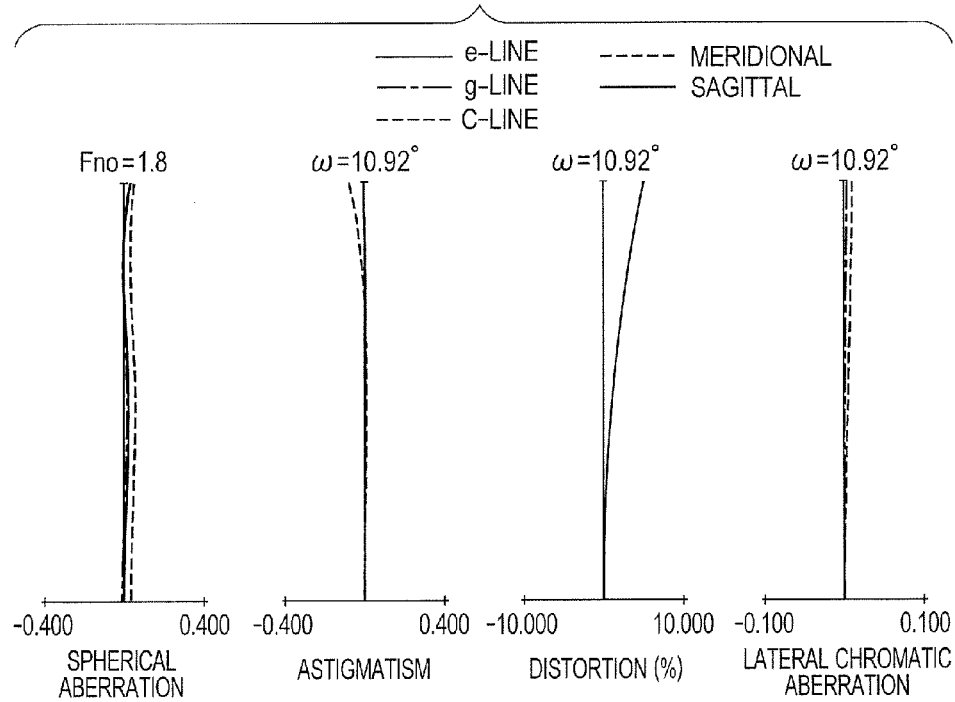
FIG. 8B is an aberration diagram when focused on the object at infinity at the zoom position z1 according to Numerical Embodiment 1.
Figure 8C:
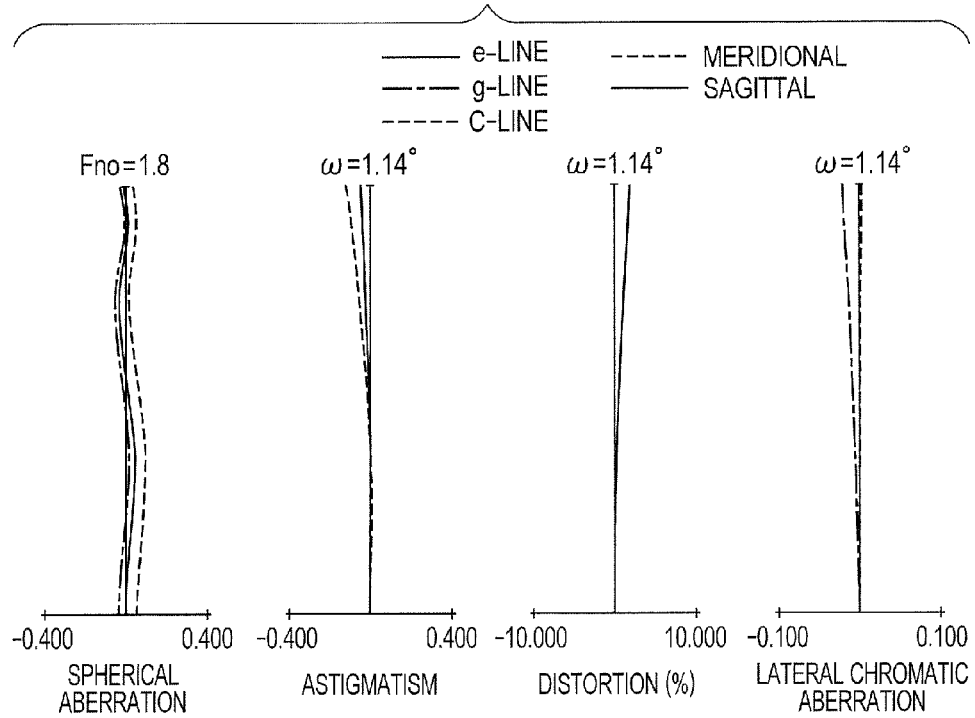
FIG. 8C is an aberration diagram when focused on the object at infinity at the zoom position z2 according to Numerical Embodiment 1.
Figure 8D:
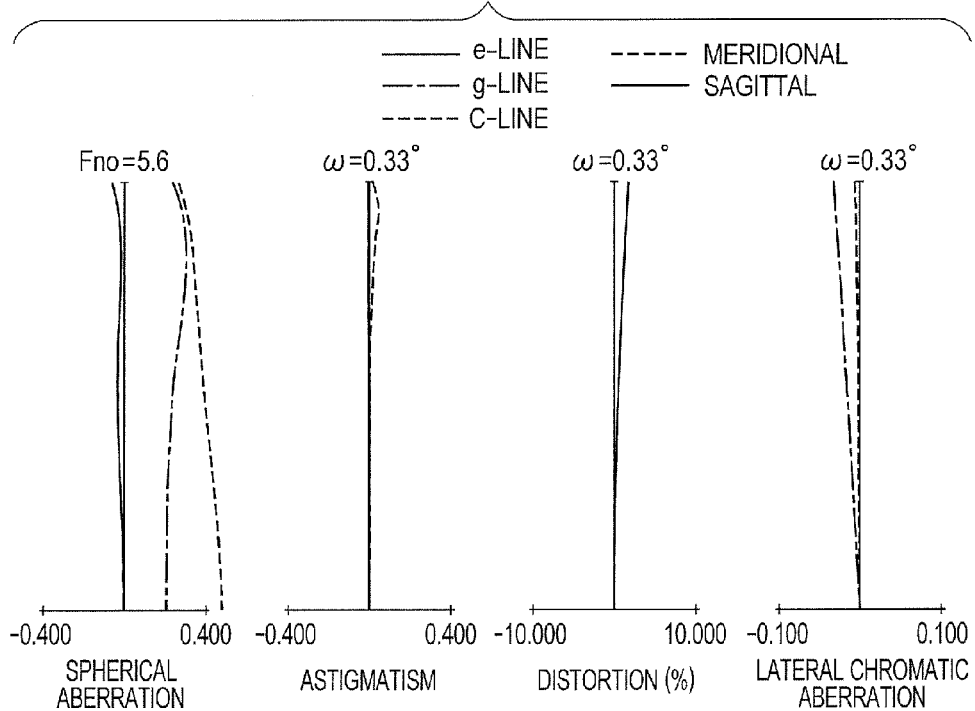
FIG. 8D is an aberration diagram when focused on the object at infinity at the telephoto end according to Numerical Embodiment 1.

FIG. 7 is a lens cross-sectional view of the zoom lens when focused on the object at infinity at the wide angle end (focal length f=8.8 mm) according to Embodiment 1 (Numerical Embodiment 1) of the present invention. The lens cross-sectional views illustrate, on the image side of the fifth lens unit U5, in order from the object side, a stop (aperture stop) SP, a glass block P representing a color separation prism, an optical filter, and the like, and an image plane I. In the figure, the glass block P includes the color separation prism, the optical filter, and the like. The image plane I corresponds to an image plane of a solid-state image pickup element (photo-electric transducer) or the like for receiving an image formed by the zoom lens and performing photoelectric conversion.

In the zoom lens of Embodiment 1, the first lens unit U1 corresponds to the 1st to 10th lens surfaces. The second lens unit U2 corresponds to the 11th to 17th lens surfaces. The third lens unit U3 corresponds to the 18th to 24th lens surfaces. The fourth lens unit U4 corresponds to the 25th to 28th lens surfaces.

During zooming from the wide angle end to the telephoto end, when the second lens unit U2 moves linearly to the image side, the third lens unit U3 and the fourth lens unit U4 substantially move from the image side to the object side on uncurved loci at the middle zoom position. The fourth lens unit U4 moves once to the image side in order to correct the variations in aberrations near the zoom position z1 on the wide angle side, and then substantially moves from the image side to the object side on a non-linear locus. Further, the interval between the third lens unit U3 and the fourth lens unit U4 is decreased near the zoom position z2, and the combined lens unit including the third and fourth lens units U3 and U4 is positioned on the image side. In this manner, an increase in lens diameter of the combined lens unit is suppressed. Further, the interval between the third lens unit U3 and the fourth lens unit U4 is increased at the telephoto end, and the combined lens unit including the third and fourth lens units U3 and U4 is positioned on the image side. In this manner, the amount of movement of the second lens unit U2 may be increased on the locus that is advantageous for the increase in zoom ratio.

The second of the four zoom positions is the zoom position z1 (f=28.50 mm), and the lens diameter of the first lens unit U1 is determined near the focal length. The third is the zoom position z2 (f=275.82 mm), and the imaging magnification $\beta 2$ of the second lens unit is −1. Near the focal length, the lens diameters of the third lens unit U3 and the fourth lens unit U4 are determined.

The 11th, 19th, and 25th lens surfaces have aspherical shapes. The 11th lens surface mainly corrects a distortion on the wide angle side, and the 19th and 25th lens surfaces correct off-axial aberrations such as a coma on the wide angle side and the spherical aberration on the telephoto side.

FIGS. 8A to 8D are aberration diagrams when focused on the object at infinity at the wide angle end, the zoom position (focal length) z1 (f=28.50 mm), the zoom position (focal length) z2 (f=275.82 mm), and the telephoto end at which f=968.00 mm according to Numerical Embodiment 1, respectively. Note that, the focal lengths are values when values of numerical embodiments are expressed in mm. The same also applies to the embodiments below.

In the aberration diagrams, a straight line, a one-dot dashed line, and a dotted line of the spherical aberration represent an e-line, a g-line, and a C-line, respectively. A dotted line and a solid line in the astigmatism represent a meridional image plane and a sagittal image plane, respectively, and a one-dot dashed line and a dotted line in a lateral chromatic aberration represent the g-line and the C-line, respectively. A half angle of field is represented by ω, and an F-number is represented by Fno. Note that, in the following embodiments, a case where a lens unit for zooming is located at a shortest focal length side is referred to as the wide angle end, and a case where a lens unit for zooming is located at a longest focal length side is referred to as the telephoto end.

As shown in Table 1 to be described later, Numerical Embodiment 1 satisfies all of Conditional Expressions (1) to (13), and attains the high zoom ratio of 110 and an increase in angle of field with a photographing angle of field (angle of field) at the wide angle end of 64.01°. Moreover, high optical performance is provided with the aberrations being corrected satisfactorily over the entire zoom range.

Next, Numerical Embodiment 1 corresponding to Embodiment 1 of the present invention is shown below. In the numerical embodiment, "i" represents the order of a surface from the object side, "ri" represents a radius of curvature of an i-th surface from the object side, "di" represents an interval between the i-th surface and the (i+1)th surface from the object side, and "ndi" and "vdi" respectively represent a refractive index and an Abbe constant of the i-th optical material. The lens surfaces having the aspherical surfaces are marked with asterisks (*) on the left side of surface numbers. The final three surfaces correspond to a glass block such as a filter. Table 1 shows correspondences between each embodiment and the conditional expressions described above.

Note that, the aspherical shape is expressed by the following expression:

$$X = \frac{H^2/R}{1 + \sqrt{1-(1+k)(H/R)^2}} + A4H^4 + A6H^6 + A8H^8$$

where X is a coordinate in the optical axis direction; H is a coordinate in a direction perpendicular to the optical axis; a traveling direction of light corresponds to a positive direction; R is a paraxial radius of curvature; k is a conic constant; and A4, A6, and A8 are aspherical coefficients. "e-Z" means "×10$^{-z}$". Note that, the same also applies to the numerical embodiments below.

Numerical Embodiment 1

| Unit: mm Surface data | | | | | | | |
|---|---|---|---|---|---|---|---|
| Surface number | r | d | nd | vd | θgF | Effective diameter | Focal length |
| 1 | 6797.00000 | 6.00000 | 1.834000 | 37.16 | 0.5775 | 192.593 | −425.783 |
| 2 | 339.38183 | 1.55392 | | | | 185.954 | |
| 3 | 328.64687 | 25.64875 | 1.433870 | 95.10 | 0.5373 | 185.578 | 464.151 |
| 4 | −511.04586 | 25.85381 | | | | 184.366 | |
| 5 | 342.57109 | 15.01615 | 1.433870 | 95.10 | 0.5373 | 175.902 | 765.287 |
| 6 | −11597.47237 | 0.25000 | | | | 175.463 | |
| 7 | 244.16605 | 16.15023 | 1.433870 | 95.10 | 0.5373 | 172.153 | 681.145 |
| 8 | 1360.51151 | 1.20000 | | | | 170.995 | |
| 9 | 206.55243 | 14.00000 | 1.496999 | 81.54 | 0.5374 | 163.686 | 837.878 |
| 10 | 399.44933 | (Variable) | | | | 160.544 | |
| 11* | 1146.47021 | 2.00000 | 1.882997 | 40.76 | 0.5667 | 45.268 | −53.384 |
| 12 | 45.49218 | 8.19436 | | | | 39.674 | |
| 13 | −82.28400 | 1.90000 | 1.816000 | 46.62 | 0.5568 | 38.566 | −63.967 |
| 14 | 146.27271 | 3.84668 | | | | 37.579 | |
| 15 | −87.95320 | 1.90000 | 1.834807 | 42.71 | 0.5642 | 37.505 | 45.356 |
| 16 | 67.79927 | 6.01825 | 1.959060 | 17.47 | 0.6599 | 38.399 | 52.078 |
| 17 | −190.94156 | (Variable) | | | | 39.233 | |
| 18 | 199.43346 | 9.10556 | 1.603001 | 65.44 | 0.5402 | 76.508 | 185.102 |
| 19* | −251.19110 | 0.50000 | | | | 77.133 | |
| 20 | 199.55740 | 12.04291 | 1.438750 | 94.93 | 0.5343 | 78.655 | 193.044 |
| 21 | −145.07467 | 0.20000 | | | | 78.727 | |
| 22 | 111.42583 | 2.50000 | 1.846660 | 23.78 | 0.6205 | 76.086 | −188.165 |
| 23 | 65.15178 | 14.80454 | 1.496999 | 81.54 | 0.5374 | 72.978 | 129.535 |
| 24 | −6654.57563 | (Variable) | | | | 72.104 | |
| 25* | 127.25822 | 3.50000 | 1.749505 | 35.33 | 0.5818 | 69.463 | −166.119 |
| 26 | 62.39948 | 0.19784 | | | | 65.771 | |
| 27 | 62.40201 | 11.59414 | 1.620411 | 60.29 | 0.5426 | 65.792 | 99.349 |
| 28 | −6882.21077 | (Variable) | | | | 64.935 | |
| 29 (Stop) | ∞ | 3.18904 | | | | 32.296 | |
| 30 | −93.00692 | 1.80000 | 1.816000 | 46.62 | 0.5568 | 31.013 | −28.150 |
| 31 | 30.97861 | 5.48005 | 1.808095 | 22.76 | 0.6307 | 29.679 | 42.758 |
| 32 | 253.25269 | 6.96512 | | | | 29.272 | |
| 33 | −30.76052 | 1.49977 | 1.816000 | 46.62 | 0.5568 | 28.497 | −24.225 |
| 34 | 57.34289 | 9.60444 | 1.548141 | 45.79 | 0.5685 | 30.824 | 35.080 |
| 35 | −27.42176 | 24.91827 | | | | 31.994 | |
| 36 | −215.30071 | 9.39368 | 1.487490 | 70.23 | 0.5300 | 32.739 | 85.333 |
| 37 | −35.46337 | 1.35680 | | | | 33.135 | |
| 38 | −94.43561 | 3.73535 | 1.834000 | 37.16 | 0.5775 | 31.246 | −39.040 |
| 39 | 51.08404 | 8.39043 | 1.487490 | 70.23 | 0.5300 | 30.631 | 55.876 |
| 40 | −55.61116 | 0.19999 | | | | 30.803 | |
| 41 | 1485.67954 | 5.91933 | 1.517417 | 52.43 | 0.5564 | 30.263 | 55.867 |
| 42 | −29.57610 | 3.99459 | 1.882997 | 40.76 | 0.5667 | 29.996 | −58.704 |
| 43 | −72.68917 | 5.39164 | | | | 30.699 | |
| 44 | 72.70044 | 4.12142 | 1.517417 | 52.43 | 0.5564 | 29.174 | 79.531 |
| 45 | −93.96287 | 10.00000 | | | | 28.848 | |
| 46 | ∞ | 33.00000 | 1.608590 | 46.44 | 0.5664 | 60.000 | 0.000 |
| 47 | ∞ | 13.20000 | 1.516330 | 64.15 | 0.5352 | 60.000 | 0.000 |
| 48 | ∞ | 10.01262 | | | | 60.000 | |
| Image plane | ∞ | | | | | | |

-continued

Aspherical surface data

Eleventh surface

K = 6.40406e+002   A4 = 1.93315e−007   A6 = −2.69890e−010   A8 = 1.42143e−013
Nineteenth surface K = −4.79134e+001   A4 = −1.81299e−007   A6 = 1.06331e−010   A8 = −1.59896e−014
Twenty-fifth surface K = 1.96569e+000   A4 = −1.32891e−007   A6 = −1.24824e−011   A8 = −3.22804e−015

Various data
Zoom ratio 110.00

| | | | | |
|---|---|---|---|---|
| Focal length | 8.80 | 28.50 | 275.82 | 968.00 |
| F-number | 1.80 | 1.80 | 1.80 | 5.60 |
| Half angle of field | 32.01 | 10.92 | 1.14 | 0.33 |
| Image height | 5.50 | 5.50 | 5.50 | 5.50 |
| Total lens length | 636.28 | 636.28 | 636.28 | 636.28 |
| d10 | 2.77 | 98.55 | 183.89 | 199.17 |
| d17 | 282.68 | 170.18 | 57.68 | 2.00 |
| d24 | 1.18 | 14.74 | 1.56 | 29.89 |
| d28 | 3.50 | 6.66 | 47.00 | 59.07 |
| Incident pupil position | 121.88 | 392.78 | 2558.13 | 12283.52 |
| Exit pupil position | 183.88 | 183.88 | 183.88 | 183.88 |
| Front principal point position | 131.12 | 425.96 | 3271.49 | 18640.71 |
| Rear principal point position | 1.21 | −18.49 | −265.80 | −957.98 |

Zoom lens unit data

| Unit | First surface | Focal length | Lens structure length | Front principal point position | Rear principal point position |
|---|---|---|---|---|---|
| 1 | 1 | 257.97 | 105.67 | 60.47 | −18.29 |
| 2 | 11 | −25.58 | 23.86 | 4.66 | −13.30 |
| 3 | 18 | 79.74 | 39.15 | 7.84 | −18.50 |
| 4 | 25 | 253.64 | 15.29 | −0.34 | −9.68 |
| 5 | 29 | 42.43 | 152.16 | 56.91 | 17.17 |

Embodiment 2

The zoom lens according to Embodiment 2 also has a configuration similar to that of the zoom lens according to Embodiment 1.

Figure 9:
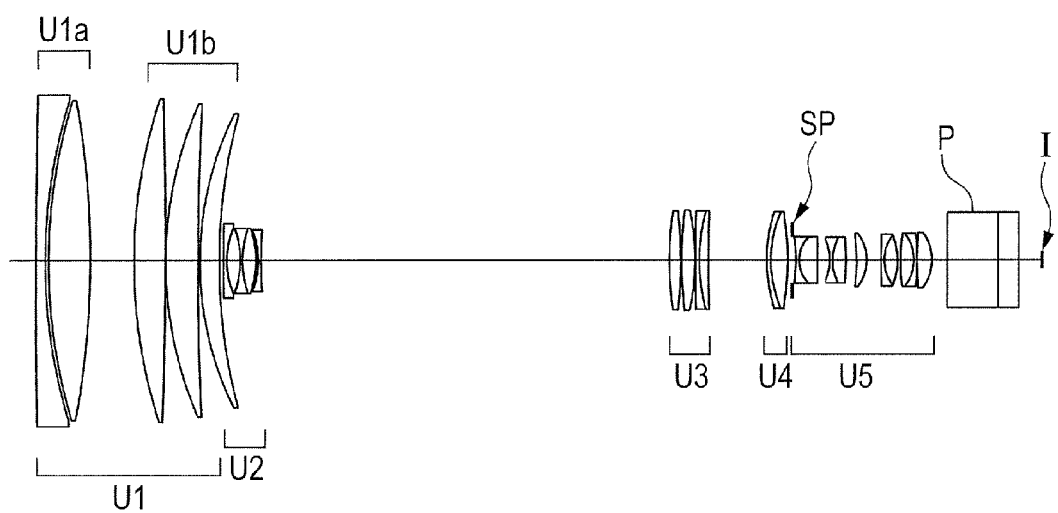
FIG. 9 is a lens cross-sectional view when focused on the object at infinity at the wide angle end according to Numerical Embodiment 2.
Figure 10A:
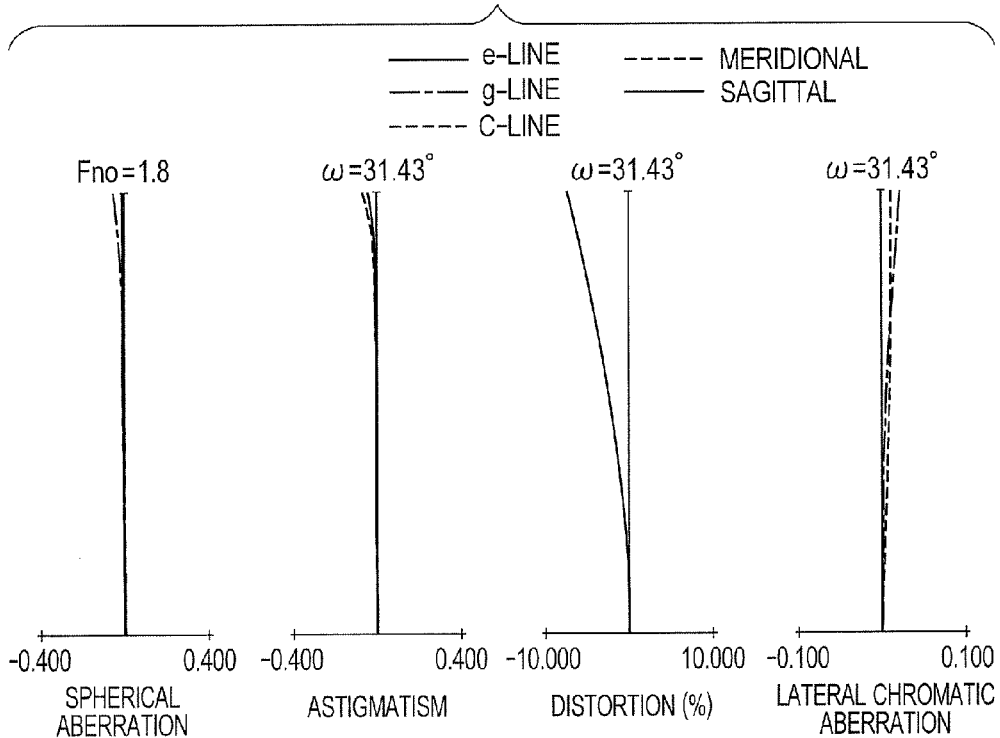
FIG. 10A is an aberration diagram when focused on the object at infinity at the wide angle end according to Numerical Embodiment 2.
Figure 10B:
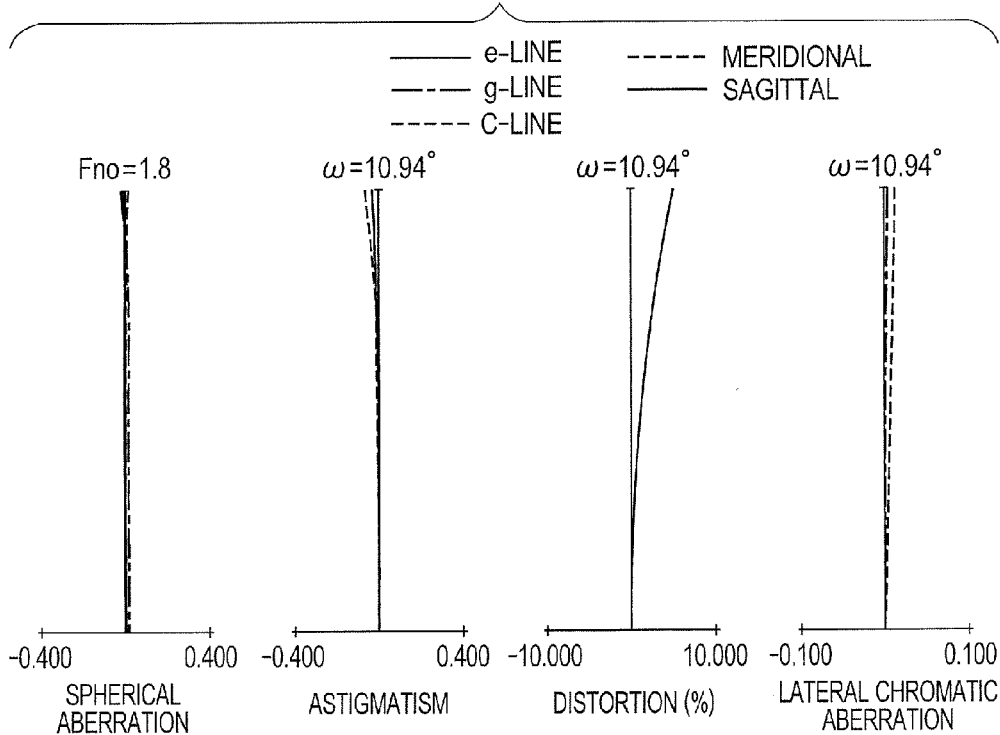
FIG. 10B is an aberration diagram when focused on the object at infinity at the zoom position z1 according to Numerical Embodiment 2.

FIG. 9 is a lens cross-sectional view of the zoom lens when focused on the object at infinity at the wide angle end (focal length f=9.00 mm) according to Embodiment 2 (Numerical Embodiment 2) of the present invention.

In Embodiment 2, the first lens unit U1 corresponds to the 1st to 10th lens surfaces. The second lens unit U2 corresponds to the 11th to 17th lens surfaces. The third lens unit U3 corresponds to the 18th to 24th lens surfaces. The fourth lens unit U4 corresponds to the 25th to 27th lens surfaces.

During zooming from the wide angle end to the telephoto end, when the second lens unit U2 moves linearly to the image side, the third lens unit U3 substantially moves from the image side to the object side along a non-linear locus at the middle zoom position. Compared to Embodiment 1, the interval between the third lens unit U3 and the fourth lens unit U4 is increased especially at the wide angle end so as to provide a greater effect of reducing the lens diameters of the third and fourth lens units U3 and U4.

The second of the four zoom positions is the zoom position z1 (f=28.46 mm), and the lens diameter of the first lens unit U1 is determined near the focal length. The third is the zoom position z2 (f=249.84 mm), and the imaging magnification β2 of the second lens unit is −1. Near the focal length, the lens diameters of the third and fourth lens units U3 and U4 are determined.

The 11th, 19th, and 27th lens surfaces have aspherical shapes. The 11th lens surface mainly corrects a distortion on the wide angle side, and the 19th and 27th lens surfaces correct off-axial aberrations such as a coma on the wide angle side and the spherical aberration on the telephoto side.

FIGS. 10A to 10D are aberration diagrams when focused on the object at infinity at the wide angle end, the zoom position (focal length) z1 (f=28.46 mm), the zoom position (focal length) z2 (f=249.84 mm), and the telephoto end at which f=899.98 mm according to Numerical Embodiment 2, respectively.

As shown in Table 1 to be described later, Numerical Embodiment 2 satisfies all of Conditional Expressions (1) to (13). Embodiment 2 attains the high zoom ratio of 100 and the increase in angle of field with a photographing angle of field (angle of field) at the wide angle end of 62.86°. Moreover, the high optical performance is provided with the aberrations being corrected satisfactorily over the entire zoom range.

Numerical Embodiment 2

Unit: mm
Surface data

| Surface number | r | d | nd | vd | θgF | Effective diameter | Focal length |
|---|---|---|---|---|---|---|---|
| 1 | 5434.02380 | 6.00000 | 1.834000 | 37.16 | 0.5775 | 210.014 | −455.000 |
| 2 | 356.63625 | 2.13509 | | | | 202.496 | |
| 3 | 360.44201 | 27.02044 | 1.433870 | 95.10 | 0.5373 | 202.125 | 515.715 |
| 4 | −580.45663 | 28.08162 | | | | 201.296 | |
| 5 | 339.84204 | 20.27987 | 1.433870 | 95.10 | 0.5373 | 204.280 | 718.034 |
| 6 | −3786.15639 | 0.25000 | | | | 203.799 | |
| 7 | 253.96136 | 20.82550 | 1.433870 | 95.10 | 0.5373 | 198.551 | 666.314 |
| 8 | 2001.56949 | 1.20000 | | | | 197.274 | |
| 9 | 216.57139 | 12.48564 | 1.496999 | 81.54 | 0.5374 | 186.080 | 1010.879 |
| 10 | 372.53916 | (Variable) | | | | 183.997 | |
| 11* | −73071.60959 | 2.20000 | 2.003300 | 28.27 | 0.5980 | 46.735 | −55.496 |
| 12 | 56.18822 | 8.59820 | | | | 41.636 | |
| 13 | −63.32560 | 1.40000 | 1.834000 | 37.16 | 0.5775 | 40.462 | −37.351 |
| 14 | 62.71093 | 8.69492 | 1.959060 | 17.47 | 0.6599 | 39.566 | 34.417 |
| 15 | −66.78678 | 1.51820 | | | | 39.183 | |
| 16 | −51.49036 | 1.60000 | 1.882997 | 40.76 | 0.5667 | 38.358 | −47.100 |
| 17 | 226.27163 | (Variable) | | | | 37.865 | |
| 18 | 211.69445 | 7.52775 | 1.595220 | 67.74 | 0.5442 | 61.514 | 190.610 |
| 19* | −243.06787 | 0.50000 | | | | 62.181 | |
| 20 | 273.48577 | 8.73422 | 1.595220 | 67.74 | 0.5442 | 62.939 | 161.635 |
| 21 | −147.44671 | 0.20000 | | | | 63.043 | |
| 22 | 778.09768 | 2.50000 | 1.846660 | 23.78 | 0.6205 | 62.121 | −166.709 |
| 23 | 120.29490 | 6.00935 | 1.438750 | 94.93 | 0.5343 | 61.221 | 308.402 |
| 24 | 1046.36475 | (Variable) | | | | 61.101 | |
| 25 | 104.79879 | 2.50000 | 1.846660 | 23.78 | 0.6205 | 60.833 | −349.121 |
| 26 | 76.71439 | 11.01805 | 1.595220 | 67.74 | 0.5442 | 59.628 | 89.918 |
| 27* | −169.48400 | (Variable) | | | | 59.081 | |
| 28 (Stop) | ∞ | 2.36822 | | | | 29.373 | |
| 29 | −89.03149 | 2.00000 | 1.816000 | 46.62 | 0.5568 | 28.698 | −20.703 |
| 30 | 21.19400 | 11.91473 | 1.846660 | 23.78 | 0.6205 | 27.513 | 24.270 |
| 31 | −737.35131 | 7.78511 | | | | 26.359 | |
| 32 | −31.36783 | 2.00000 | 1.882997 | 40.76 | 0.5667 | 24.441 | −17.675 |
| 33 | 32.36570 | 8.63520 | 1.620411 | 60.29 | 0.5426 | 26.003 | 46.225 |
| 34 | −234.07138 | 6.76154 | | | | 28.279 | |
| 35 | −130.69482 | 6.66518 | 1.589130 | 61.14 | 0.5406 | 32.060 | 58.965 |
| 36 | −28.04978 | 9.16258 | | | | 33.116 | |
| 37 | 319.52271 | 2.00000 | 1.882997 | 40.76 | 0.5667 | 32.000 | −32.330 |
| 38 | 26.26833 | 8.58866 | 1.518229 | 58.90 | 0.5456 | 31.410 | 33.381 |
| 39 | 45.53131 | 2.02791 | | | | 31.559 | |
| 40 | 126.09468 | 8.60709 | 1.487490 | 70.23 | 0.5300 | 31.722 | 46.804 |
| 41 | −27.34549 | 2.00000 | 1.882997 | 40.76 | 0.5667 | 31.555 | −36.180 |
| 42 | −189.85376 | 0.19963 | | | | 33.064 | |
| 43 | 218.32118 | 9.40095 | 1.531717 | 48.84 | 0.5630 | 33.531 | 50.688 |
| 44 | −30.45438 | 10.00000 | | | | 34.228 | |
| 45 | ∞ | 33.00000 | 1.608590 | 46.44 | 0.5664 | 60.000 | 0.000 |
| 46 | ∞ | 13.20000 | 1.516330 | 64.15 | 0.5352 | 60.000 | 0.000 |
| 47 | ∞ | 15.07578 | | | | 60.000 | |
| Image plane | ∞ | | | | | | |

Aspherical surface data

Eleventh surface

K = 1.69407e+006   A4 = 7.95307e−007   A6 = −9.70819e−011   A8 = 2.85357e−013

Nineteenth surface

K = −1.45313e+001   A4 = 1.51572e−007   A6 = 2.29624e−011   A8 = −3.73351e−015

Twenty-seventh surface

K = 7.92880e+000   A4 = 4.02021e−007   A6 = 2.13607e−011   A8 = 1.56802e−014

Various data
Zoom ratio 100.00

| | | | | |
|---|---|---|---|---|
| Focal length | 9.00 | 28.46 | 249.84 | 899.98 |
| F-number | 1.80 | 1.80 | 1.86 | 4.50 |
| Half angle of field | 31.43 | 10.94 | 1.26 | 0.35 |
| Image height | 5.50 | 5.50 | 5.50 | 5.50 |
| Total lens length | 649.62 | 649.62 | 649.62 | 649.62 |
| d10 | 2.78 | 102.78 | 191.99 | 206.13 |
| d17 | 263.53 | 152.41 | 59.76 | 2.12 |
| d24 | 37.64 | 32.13 | 0.75 | 9.46 |

-continued

| | | | | |
|---|---|---|---|---|
| d27 | 3.00 | 19.64 | 54.45 | 89.25 |
| Incident pupil position | 133.88 | 423.37 | 2798.46 | 13226.17 |
| Exit pupil position | 162.00 | 162.00 | 162.00 | 162.00 |
| Front principal point position | 143.43 | 457.35 | 3473.15 | 19639.08 |
| Rear principal point position | 6.08 | −13.39 | −234.77 | −884.91 |

Zoom lens unit data

| Unit | First surface | Focal length | Lens structure length | Front principal point position | Rear principal point position |
|---|---|---|---|---|---|
| 1 | 1 | 268.44 | 118.28 | 68.00 | −19.95 |
| 2 | 11 | −24.98 | 24.01 | 6.61 | −9.08 |
| 3 | 18 | 115.10 | 25.47 | 3.39 | −13.00 |
| 4 | 25 | 121.89 | 13.52 | 3.00 | −5.41 |
| 5 | 28 | 39.60 | 146.32 | 54.10 | 14.31 |

Embodiment 3

The zoom lens according to Embodiment 3 also has a configuration similar to that of the zoom lens according to Embodiment 1.

Figure 11:
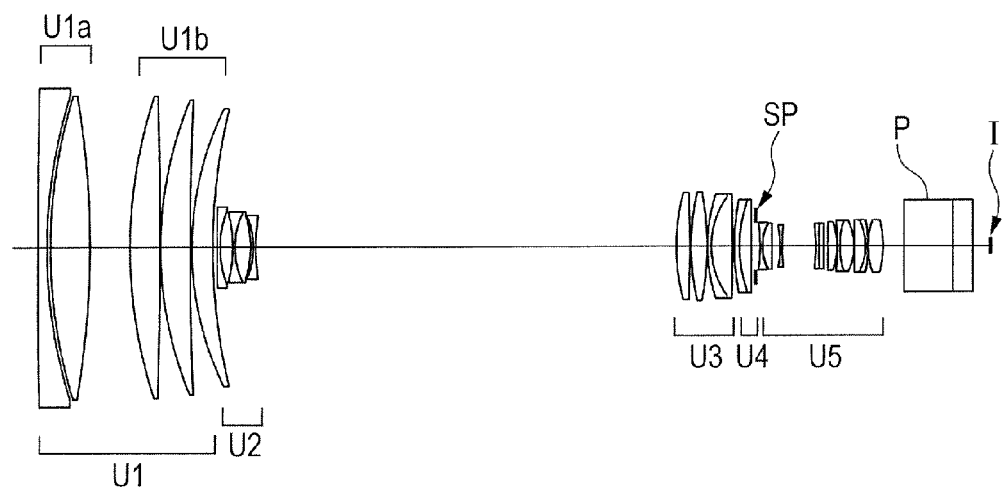
FIG. 11 is a lens cross-sectional view when focused on the object at infinity at the wide angle end according to Numerical Embodiment 3.
Figure 12C:
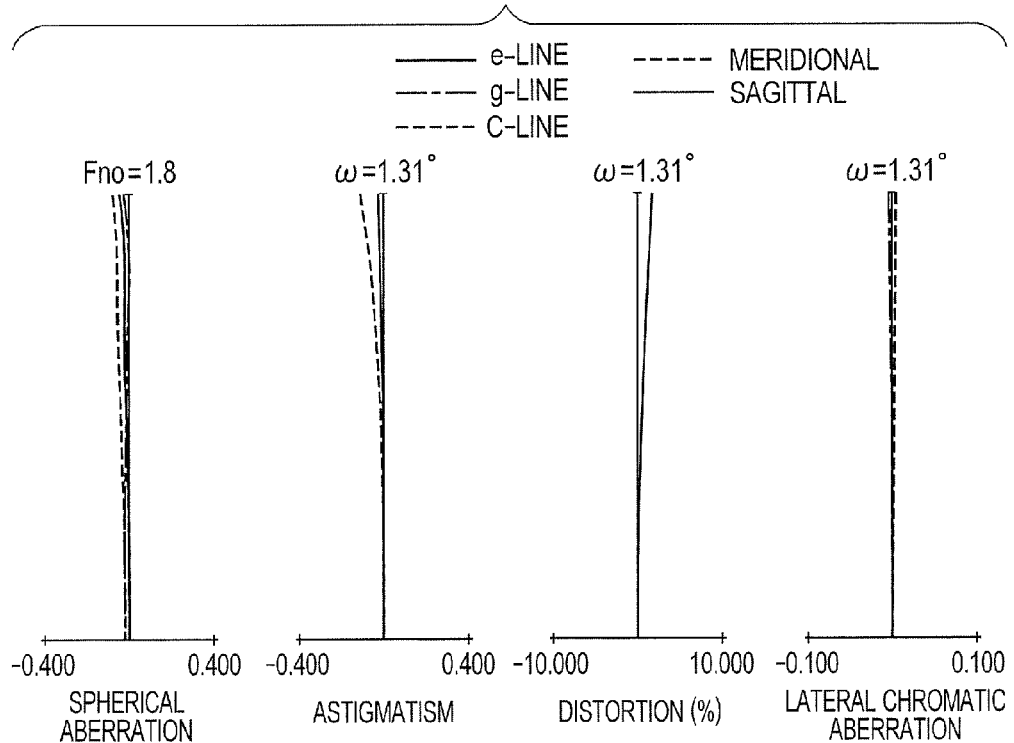
FIG. 12C is an aberration diagram when focused on the object at infinity at the zoom position z2 according to Numerical Embodiment 3.
Figure 12D:
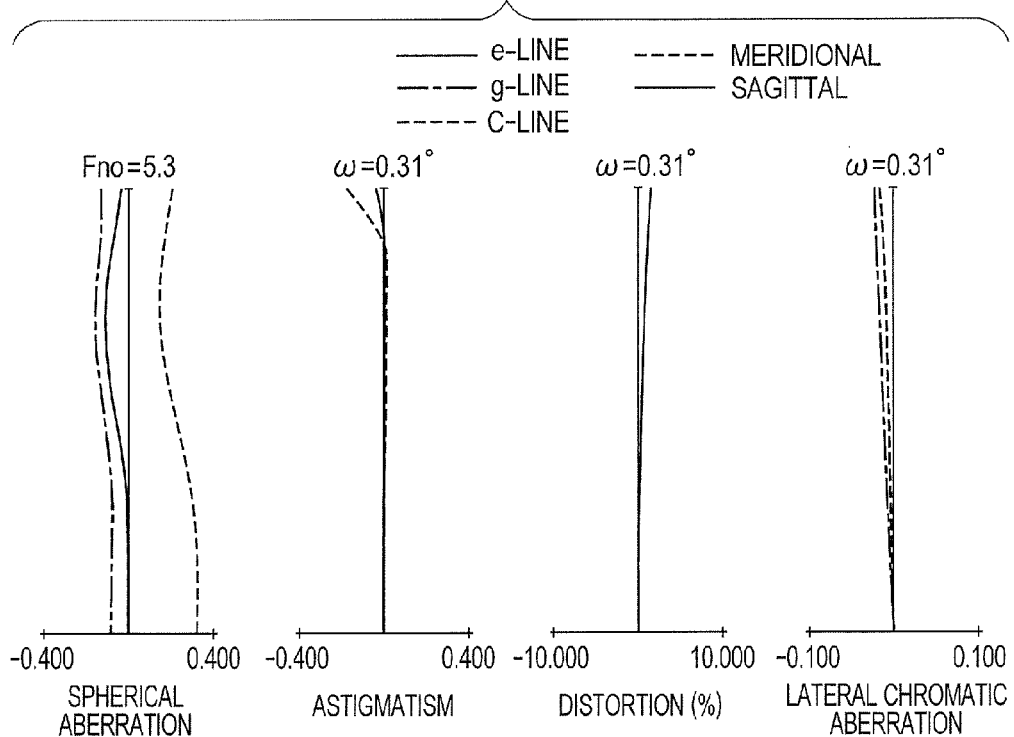
FIG. 12D is an aberration diagram when focused on the object at infinity at the telephoto end according to Numerical Embodiment 3.

FIG. 11 is a lens cross-sectional view of the zoom lens when focused on the object at infinity at the wide angle end (focal length f=8.9 mm) according to Embodiment 3 (Numerical Embodiment 3) of the present invention.

In Embodiment 3, the first lens unit U1 corresponds to the 1st to 10th lens surfaces. The second lens unit U2 corresponds to the 11th to 17th lens surfaces. The third lens unit U3 corresponds to the 18th to 24th lens surfaces. The fourth lens unit U4 corresponds to the 25th to 27th lens surfaces.

During zooming from the wide angle end to the telephoto end, when the second lens unit U2 moves linearly to the image side, the third lens unit U3 substantially moves from the image side to the object side along a non-linear locus at the middle zoom position. Compared to Embodiment 1, the interval between the third lens unit U3 and the fourth lens unit U4 is increased especially at the telephoto end so as to provide a locus advantageous for increasing the zoom ratio.

The second of the four zoom positions is the zoom position z1 (f=29.15 mm), and the lens diameter of the first lens unit U1 is determined near the focal length. The third is the zoom position z2 (f=239.84 mm), and the imaging magnification β2 of the second lens unit is −1. Near the focal length, the lens diameters of the third and fourth lens units U3 and U4 are determined.

The 11th, 19th, and 25th lens surfaces have aspherical shapes. The 11th lens surface mainly corrects a distortion on the wide angle side, and the 19th and 25th lens surfaces correct off-axial aberrations such as a coma on the wide angle side and the spherical aberration on the telephoto side.

FIGS. 12A to 12D are aberration diagrams when focused on the object at infinity at the wide angle end, the zoom position (focal length) z1 (f=29.15 mm), the zoom position (focal length) z2 (f=239.84 mm), and the telephoto end at which f=1,023.50 mm according to Numerical Embodiment 3, respectively.

As shown in Table 1 to be described later, Numerical Embodiment 3 satisfies all of Conditional Expressions (1) to (13). Embodiment 3 attains the high zoom ratio of 115 and the increase in angle of field with a photographing angle of field (angle of field) at the wide angle end of 63.43°. Moreover, the high optical performance is provided with the aberrations being corrected satisfactorily over the entire zoom range.

Numerical Embodiment 3

Unit: mm
Surface data

| Surface number | r | d | nd | vd | θgF | Effective diameter | Focal length |
|---|---|---|---|---|---|---|---|
| 1 | 5793.01429 | 6.00000 | 1.834000 | 37.16 | 0.5775 | 208.891 | −433.304 |
| 2 | 342.03734 | 2.31956 | | | | 199.751 | |
| 3 | 349.17389 | 26.51749 | 1.433870 | 95.10 | 0.5373 | 199.455 | 513.399 |
| 4 | −605.23335 | 26.73333 | | | | 198.379 | |
| 5 | 325.51120 | 20.05077 | 1.433870 | 95.10 | 0.5373 | 198.447 | 687.627 |
| 6 | −3616.03833 | 0.25000 | | | | 197.997 | |
| 7 | 256.83401 | 19.77079 | 1.433870 | 95.10 | 0.5373 | 193.358 | 670.178 |
| 8 | 2109.25001 | 1.20000 | | | | 192.135 | |
| 9 | 212.14116 | 14.00000 | 1.496999 | 81.54 | 0.5374 | 181.652 | 887.023 |
| 10 | 398.85802 | (Variable) | | | | 179.132 | |
| 11* | 16798.45555 | 2.20000 | 2.003300 | 28.27 | 0.5980 | 53.086 | −68.567 |
| 12 | 69.07870 | 8.46954 | | | | 47.566 | |
| 13 | −91.37436 | 1.40000 | 1.882997 | 40.76 | 0.5667 | 46.070 | −37.966 |
| 14 | 53.82530 | 10.47934 | 1.959060 | 17.47 | 0.6599 | 43.782 | 33.222 |
| 15 | −72.94882 | 1.93558 | | | | 43.060 | |
| 16 | −52.81839 | 1.60000 | 1.903660 | 31.32 | 0.5946 | 41.501 | −41.775 |
| 17 | 137.85390 | (Variable) | | | | 40.315 | |
| 18 | 140.80509 | 9.33322 | 1.592820 | 68.63 | 0.5446 | 69.730 | 182.507 |
| 19* | −462.54928 | 0.50000 | | | | 70.270 | |
| 20 | 161.16576 | 10.79574 | 1.592820 | 68.63 | 0.5446 | 71.263 | 146.256 |

-continued

| | | | | | | | |
|---|---|---|---|---|---|---|---|
| 21 | −184.35912 | 0.20000 | | | | 71.080 | |
| 22 | 113.12109 | 2.50000 | 1.805181 | 25.42 | 0.6161 | 68.138 | −142.208 |
| 23 | 56.59845 | 14.31731 | 1.438750 | 94.93 | 0.5343 | 64.707 | 124.475 |
| 24 | −1547.77025 | (Variable) | | | | 63.772 | |
| 25* | 159.86250 | 3.50000 | 1.666800 | 33.05 | 0.5957 | 60.822 | −320.019 |
| 26 | 90.86623 | 8.06085 | 1.639999 | 60.08 | 0.5370 | 58.755 | 136.070 |
| 27 | −2232.09151 | (Variable) | | | | 57.643 | |
| 28 (Stop) | ∞ | 2.90925 | | | | 31.311 | |
| 29 | −106.27972 | 1.40000 | 1.816000 | 46.62 | 0.5568 | 30.117 | −31.760 |
| 30 | 34.71034 | 0.20000 | | | | 28.961 | |
| 31 | 31.64649 | 6.15981 | 1.808095 | 22.76 | 0.6307 | 29.202 | 40.347 |
| 32 | 734.91671 | 5.53173 | | | | 28.501 | |
| 33 | −72.89730 | 1.40000 | 1.882997 | 40.76 | 0.5667 | 26.663 | −53.865 |
| 34 | 140.43195 | 22.71861 | | | | 26.504 | |
| 35 | −90.86857 | 1.80000 | 1.639999 | 60.08 | 0.5370 | 28.109 | −96.116 |
| 36 | 194.27351 | 2.92242 | 1.846660 | 23.78 | 0.6205 | 28.686 | −1100.236 |
| 37 | 159.90459 | 3.03000 | | | | 29.089 | |
| 38 | 1087.63312 | 6.23090 | 1.487490 | 70.23 | 0.5300 | 30.107 | 93.109 |
| 39 | −47.44488 | 0.20000 | | | | 31.035 | |
| 40 | −169.19629 | 1.60000 | 1.882997 | 40.76 | 0.5667 | 31.160 | −46.159 |
| 41 | 54.34597 | 9.62001 | 1.496999 | 81.54 | 0.5374 | 31.715 | 47.323 |
| 42 | −39.22444 | 0.20000 | | | | 32.874 | |
| 43 | 1288.47832 | 7.47811 | 1.548141 | 45.79 | 0.5685 | 32.981 | 66.762 |
| 44 | −37.78760 | 1.60000 | 1.882997 | 40.76 | 0.5667 | 33.012 | −72.972 |
| 45 | −92.43419 | 0.20000 | | | | 33.695 | |
| 46 | 54.60772 | 9.79868 | 1.487490 | 70.23 | 0.5300 | 33.726 | 64.306 |
| 47 | −69.81636 | 14.00000 | | | | 32.678 | |
| 48 | ∞ | 33.00000 | 1.608590 | 46.44 | 0.5664 | 60.000 | 0.000 |
| 49 | ∞ | 13.20000 | 1.516330 | 64.15 | 0.5352 | 60.000 | 0.000 |
| 50 | ∞ | 11.99775 | | | | 60.000 | |
| Image plane | ∞ | | | | | | |

Aspherical surface data

Eleventh surface

K = −4.15562e+006   A4 = 9.64938e−007   A6 = −2.11065e−010   A8 = 4.00855e−013

Nineteenth surface

K = −7.63858e+001   A4 = 1.91972e−007   A6 = 2.39994e−011   A8 = 3.29461e−016

Twenty-fifth surface

K = 2.26047e+000   A4 = −9.56035e−008   A6 = −2.25528e−011   A8 = 1.13017e−014

Various data
Zoom ratio 115.00

| | | | | |
|---|---|---|---|---|
| Focal length | 8.90 | 29.15 | 239.84 | 1023.50 |
| F-number | 1.80 | 1.80 | 1.80 | 5.30 |
| Half angle of field | 31.71 | 10.69 | 1.31 | 0.31 |
| Image height | 5.50 | 5.50 | 5.50 | 5.50 |
| Total lens length | 636.89 | 636.89 | 636.89 | 636.89 |
| d10 | 2.74 | 100.13 | 180.34 | 199.14 |
| d17 | 280.68 | 169.66 | 66.02 | 2.00 |
| d24 | 1.15 | 8.92 | 1.97 | 83.44 |
| d27 | 3.00 | 8.85 | 39.23 | 2.98 |
| Incident pupil position | 136.55 | 430.01 | 2366.06 | 15446.07 |
| Exit pupil position | 151.11 | 151.11 | 151.11 | 151.11 |
| Front principal point position | 146.02 | 465.26 | 3019.42 | 23999.92 |
| Rear principal point position | 3.10 | −17.15 | −227.85 | −1011.50 |

Zoom lens unit data

| Unit | First surface | Focal length | Lens structure length | Front principal point position | Rear principal point position |
|---|---|---|---|---|---|
| 1 | 1 | 260.74 | 116.84 | 67.49 | −18.81 |
| 2 | 11 | −26.63 | 26.08 | 8.33 | −8.15 |
| 3 | 18 | 77.31 | 37.65 | 6.15 | −18.81 |
| 4 | 25 | 240.15 | 11.56 | 0.32 | −6.69 |
| 5 | 28 | 39.14 | 145.20 | 55.23 | 16.79 |

Embodiment 4

The zoom lens according to Embodiment 4 also has a configuration similar to that of the zoom lens according to Embodiment 1.

Figure 13:
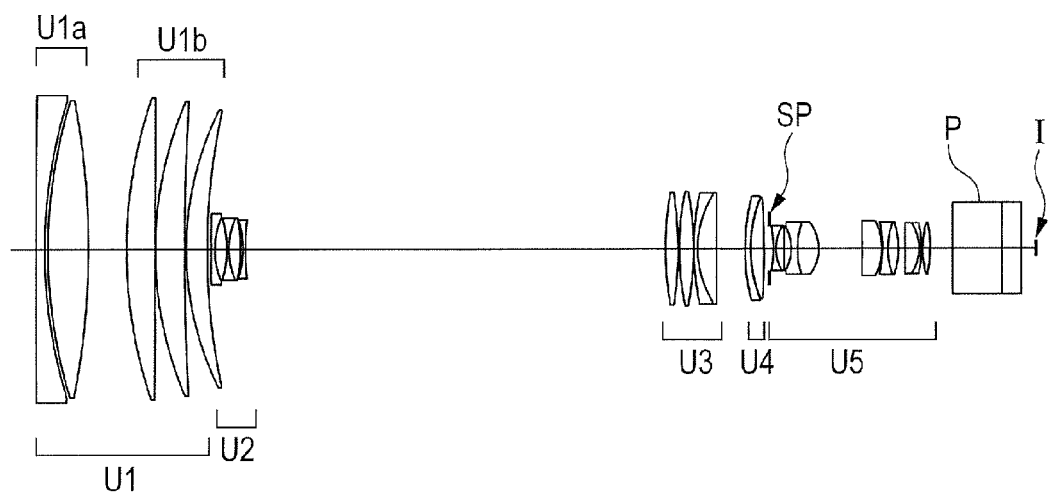
FIG. 13 is a lens cross-sectional view when focused on the object at infinity at the wide angle end according to Numerical Embodiment 4.
Figure 14A:
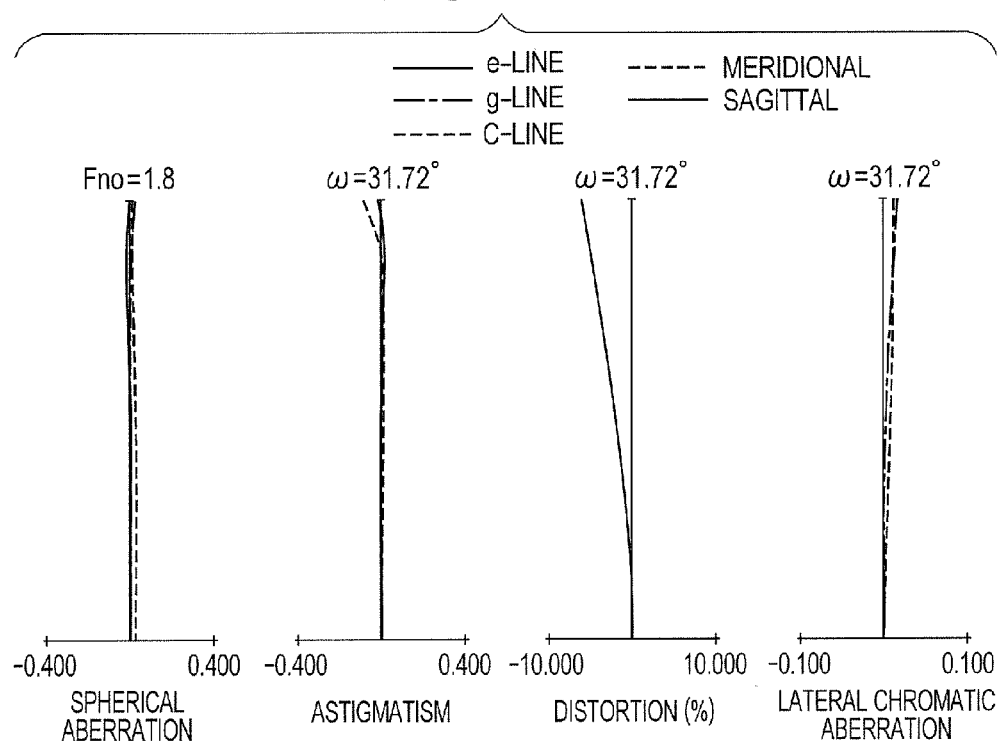
FIG. 14A is an aberration diagram when focused on the object at infinity at the wide angle end according to Numerical Embodiment 4.
Figure 14B:
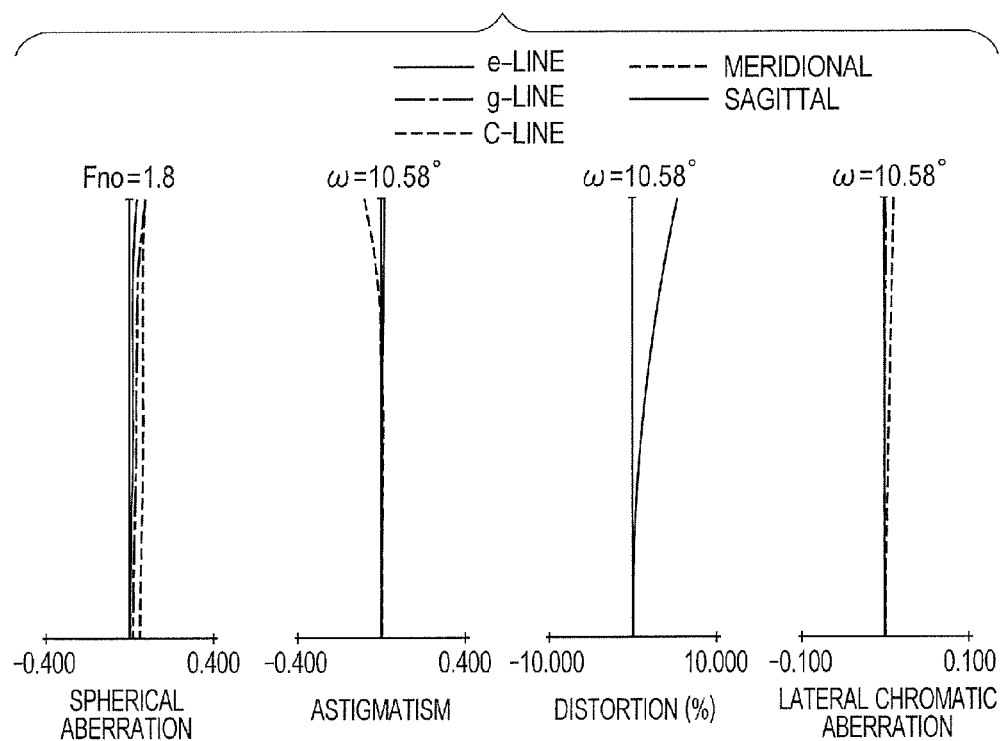
FIG. 14B is an aberration diagram when focused on the object at infinity at the zoom position z1 according to Numerical Embodiment 4.
Figure 14C:
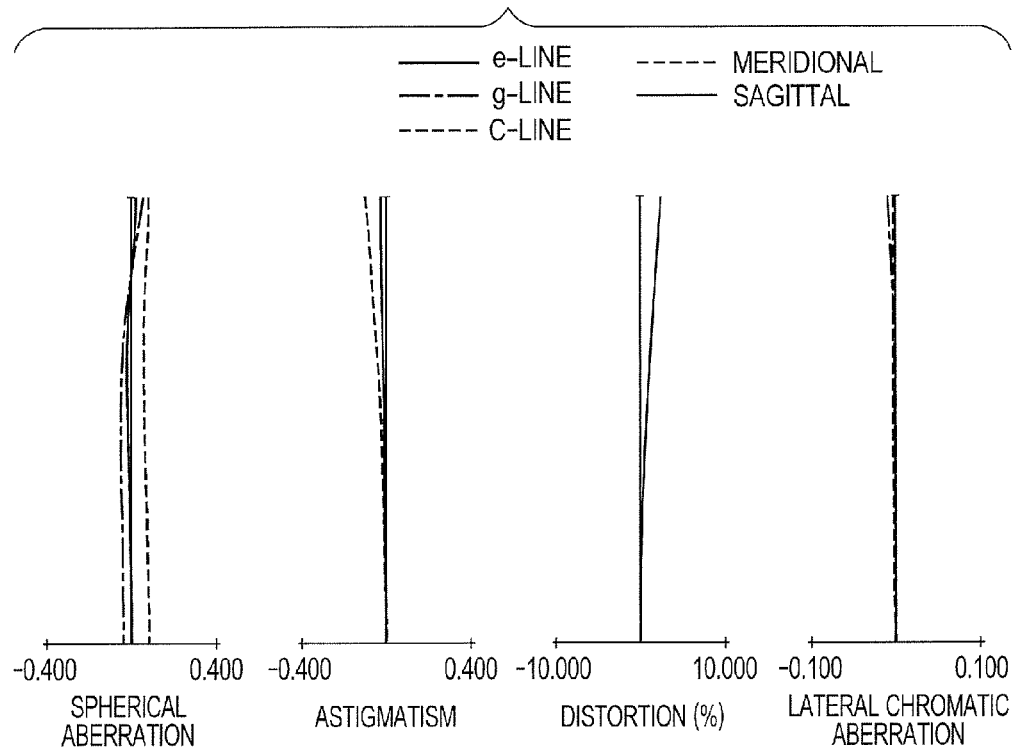
FIG. 14C is an aberration diagram when focused on the object at infinity at the zoom position z2 according to Numerical Embodiment 4.
Figure 14D:
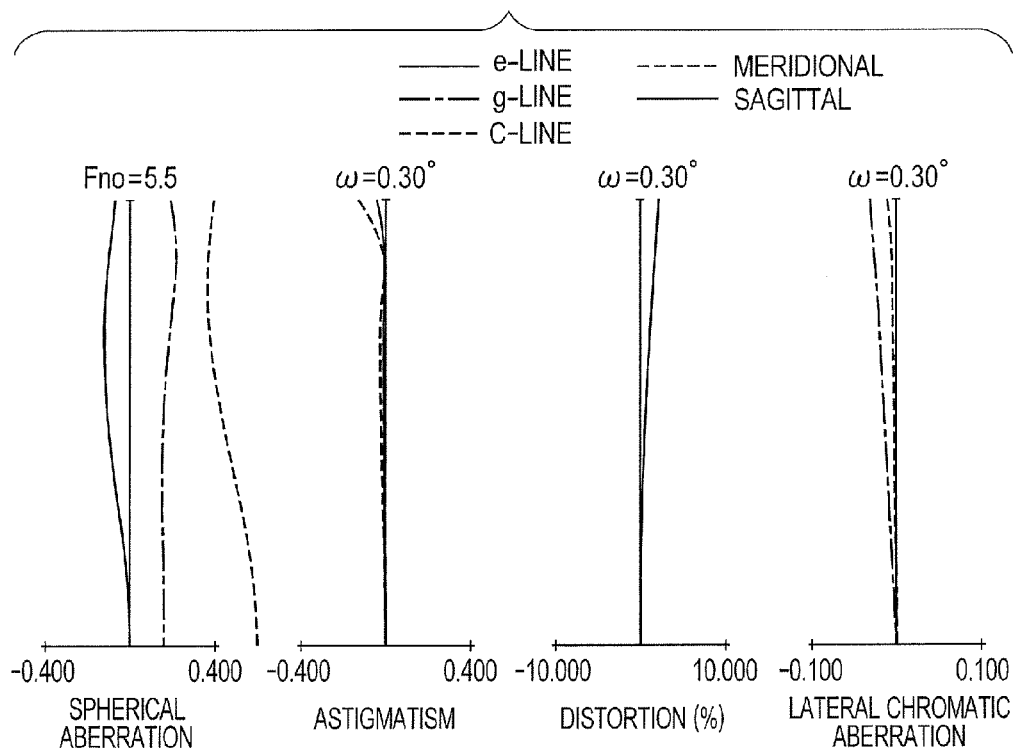
FIG. 14D is an aberration diagram when focused on the object at infinity at the telephoto end according to Numerical Embodiment 4.

FIG. 13 is a lens cross-sectional view of the zoom lens when focused on the object at infinity at the wide angle end (focal length f=8.9 mm) according to Embodiment 4 (Numerical Embodiment 4) of the present invention.

In Embodiment 4, the first lens unit U1 corresponds to the 1st to 10th lens surfaces. The second lens unit U2 corresponds to the 11th to 17th lens surfaces. The third lens unit U3 corresponds to the 18th to 24th lens surfaces. The fourth lens unit U4 corresponds to the 25th to 28th lens surfaces.

During zooming from the wide angle end to the telephoto end, when the second lens unit U2 moves linearly to the image side, the third lens unit U3 substantially moves from the image side to the object side along a non-linear locus at the middle zoom position.

The second of the four zoom positions is the zoom position z1 (f=29.46 mm), and the lens diameter of the first lens unit U1 is determined near the focal length. The third is the zoom position z2 (f=251.97 mm), and the imaging magnification β2 of the second lens unit is −1. Near the focal length, the lens diameters of the third and fourth lens units U3 and U4 are determined.

The 11th, 19th, and 25th lens surfaces have aspherical shapes. The 11th lens surface mainly corrects a distortion on the wide angle side, and the 19th and 25th lens surfaces correct off-axial aberrations such as a coma on the wide angle side and the spherical aberration on the telephoto side.

FIGS. 14A to 14D are aberration diagrams when focused on the object at infinity at the wide angle end, the zoom position (focal length) z1 (f=29.46 mm), the zoom position (focal length) z2 (f=251.97 mm), and the telephoto end at which f=1,068.00 mm according to Numerical Embodiment 4, respectively.

As shown in Table 1 to be described later, Numerical Embodiment 4 satisfies all of Conditional Expressions (1) to (13). Thus, Embodiment 4 attains the high zoom ratio of 120 and an increase in angle of field with a photographing angle of field (angle of field) at the wide angle end of 63.43°. Moreover, high optical performance is provided with the aberrations being corrected satisfactorily over the entire zoom range.

Numerical Embodiment 4

Unit: mm
Surface data

| Surface number | r | d | nd | vd | θgF | Effective diameter | Focal length |
|---|---|---|---|---|---|---|---|
| 1 | 6797.00000 | 6.00000 | 1.834000 | 37.16 | 0.5775 | 201.250 | −427.333 |
| 2 | 340.55544 | 2.16846 | | | | 194.288 | |
| 3 | 344.60560 | 27.02980 | 1.433870 | 95.10 | 0.5373 | 195.026 | 483.368 |
| 4 | −526.41708 | 25.44604 | | | | 195.609 | |
| 5 | 317.11504 | 18.90832 | 1.433870 | 95.10 | 0.5373 | 198.517 | 739.359 |
| 6 | 22370.55003 | 0.25000 | | | | 198.012 | |
| 7 | 252.02981 | 19.58207 | 1.433870 | 95.10 | 0.5373 | 193.671 | 681.551 |
| 8 | 1642.44953 | 1.20000 | | | | 192.440 | |
| 9 | 210.80230 | 14.00000 | 1.496999 | 81.54 | 0.5374 | 182.269 | 793.425 |
| 10 | 441.44413 | (Variable) | | | | 180.524 | |
| 11* | −7064.01182 | 2.20000 | 2.003300 | 28.27 | 0.5980 | 46.419 | −52.950 |
| 12 | 53.98674 | 8.05582 | | | | 41.271 | |
| 13 | −77.05757 | 1.40000 | 1.834807 | 42.71 | 0.5642 | 40.179 | −36.203 |
| 14 | 50.59902 | 7.75585 | 1.959060 | 17.47 | 0.6597 | 38.937 | 35.987 |
| 15 | −104.71398 | 1.71806 | | | | 38.522 | |
| 16 | −65.38717 | 1.60000 | 1.882997 | 40.76 | 0.5667 | 37.931 | −53.580 |
| 17 | 176.81880 | (Variable) | | | | 37.365 | |
| 18 | 211.53009 | 8.67340 | 1.618000 | 63.33 | 0.5441 | 73.576 | 170.014 |
| 19* | −207.02964 | 0.50000 | | | | 74.108 | |
| 20 | 182.48621 | 9.64438 | 1.592010 | 67.02 | 0.5357 | 75.372 | 164.013 |
| 21 | −204.97727 | 0.20000 | | | | 75.260 | |
| 22 | 183.20446 | 2.50000 | 1.805181 | 25.42 | 0.6161 | 72.978 | −133.668 |
| 23 | 67.77481 | 12.64284 | 1.438750 | 94.93 | 0.5343 | 69.956 | 154.085 |
| 24 | ∞ | (Variable) | | | | 69.529 | |
| 25* | 146.28125 | 3.50000 | 1.737999 | 32.26 | 0.5899 | 68.244 | −325.200 |
| 26 | 90.20692 | 0.18229 | | | | 66.362 | |
| 27 | 89.84076 | 9.06852 | 1.651597 | 58.55 | 0.5426 | 66.363 | 116.192 |
| 28 | 474.37141 | (Variable) | | | | 65.886 | |
| 29 (Stop) | ∞ | 2.58913 | | | | 29.588 | |
| 30 | −78.87459 | 1.80000 | 1.816000 | 46.62 | 0.5568 | 28.804 | −25.127 |
| 31 | 28.18412 | 5.33716 | 1.808095 | 22.76 | 0.6307 | 27.782 | 36.015 |
| 32 | 621.40708 | 5.00436 | | | | 27.510 | |
| 33 | −30.07184 | 3.99834 | 1.816000 | 46.62 | 0.5568 | 27.130 | −22.704 |
| 34 | 51.83074 | 14.30965 | 1.548141 | 45.79 | 0.5685 | 30.187 | 35.877 |
| 35 | −28.82109 | 29.22478 | | | | 33.552 | |
| 36 | −340.35564 | 13.14140 | 1.487490 | 70.23 | 0.5300 | 34.787 | 89.125 |
| 37 | −39.13525 | 0.19997 | | | | 35.329 | |
| 38 | −93.01765 | 3.79997 | 1.834000 | 37.16 | 0.5775 | 34.073 | −36.976 |
| 39 | 47.44248 | 7.03399 | 1.487490 | 70.23 | 0.5300 | 33.564 | 53.123 |
| 40 | −54.65398 | 4.36774 | | | | 33.700 | |
| 41 | −3347.51559 | 9.43058 | 1.517417 | 52.43 | 0.5564 | 32.558 | 60.172 |
| 42 | −31.01546 | 1.54305 | 1.882997 | 40.76 | 0.5667 | 32.036 | −58.211 |
| 43 | −79.33522 | 0.94307 | | | | 32.682 | |
| 44 | 68.15021 | 5.01899 | 1.517417 | 52.43 | 0.5564 | 33.029 | 72.477 |

-continued

| 45 | −82.10984 | 15.00000 | | | | 32.882 | |
| 46 | ∞ | 33.00000 | 1.608590 | 46.44 | 0.5664 | 60.000 | 0.000 |
| 47 | ∞ | 13.20000 | 1.516330 | 64.15 | 0.5352 | 60.000 | 0.000 |
| 48 | ∞ | 9.99980 | | | | 60.000 | |
| Image plane | ∞ | | | | | | |

Aspherical surface data

Eleventh surface

K = −2.36774e+005  A4 = 5.62251e−007  A6 = 1.21054e−010  A8 = −1.11890e−013

Nineteenth surface

K = −2.02204e+001  A4 = −4.61496e−008  A6 = 4.15741e−011  A8 = −2.11496e−015

Twenty-fifth surface

K = 3.71110e+000  A4 = −1.10320e−007  A6 = −4.77366e−011  A8 = 5.697400−015

Various data
Zoom ratio 120.00

| Focal length | 8.90 | 29.46 | 251.97 | 1068.00 |
| F-number | 1.80 | 1.80 | 1.80 | 5.50 |
| Half angle of field | 31.72 | 10.58 | 1.25 | 0.30 |
| Image height | 5.50 | 5.50 | 5.50 | 5.50 |
| Total lens length | 669.52 | 669.52 | 669.52 | 669.52 |
| d10 | 2.77 | 102.87 | 181.18 | 197.68 |
| d17 | 280.86 | 169.52 | 69.26 | 2.00 |
| d24 | 19.22 | 16.15 | 1.09 | 38.20 |
| d28 | 3.50 | 17.82 | 54.83 | 68.47 |
| Incident pupil position | 129.67 | 436.82 | 2659.43 | 17257.92 |
| Exit pupil position | 133.28 | 133.28 | 133.28 | 133.28 |
| Front principal point position | 139.21 | 473.31 | 3426.38 | 27578.10 |
| Rear principal point position | 1.10 | −19.46 | −241.97 | −1058.00 |

Zoom lens unit data

| Unit | First surface | Focal length | Lens structure length | Front principal point position | Rear principal point position |
|---|---|---|---|---|---|
| 1 | 1 | 255.48 | 114.58 | 65.47 | −19.09 |
| 2 | 11 | −24.37 | 22.73 | 6.48 | −8.41 |
| 3 | 18 | 91.75 | 34.16 | 4.55 | −17.75 |
| 4 | 25 | 182.76 | 12.75 | 1.83 | −5.91 |
| 5 | 29 | 37.03 | 168.94 | 53.49 | 12.97 |

Embodiment 5

The zoom lens according to Embodiment 5 also has a configuration similar to that of the zoom lens according to Embodiment 1.

Figure 15:
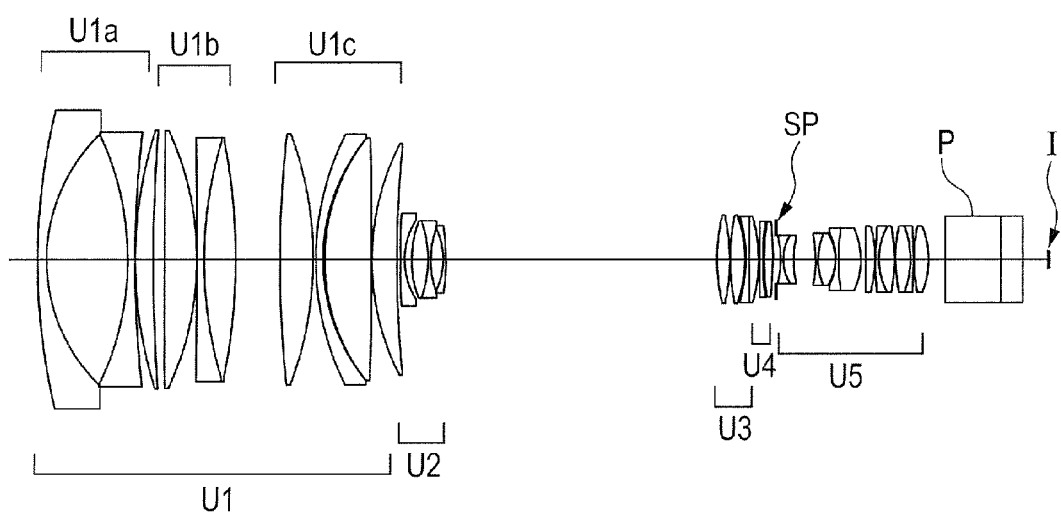
FIG. 15 is a lens cross-sectional view when focused on the object at infinity at the wide angle end according to Numerical Embodiment 5.
Figure 16A:
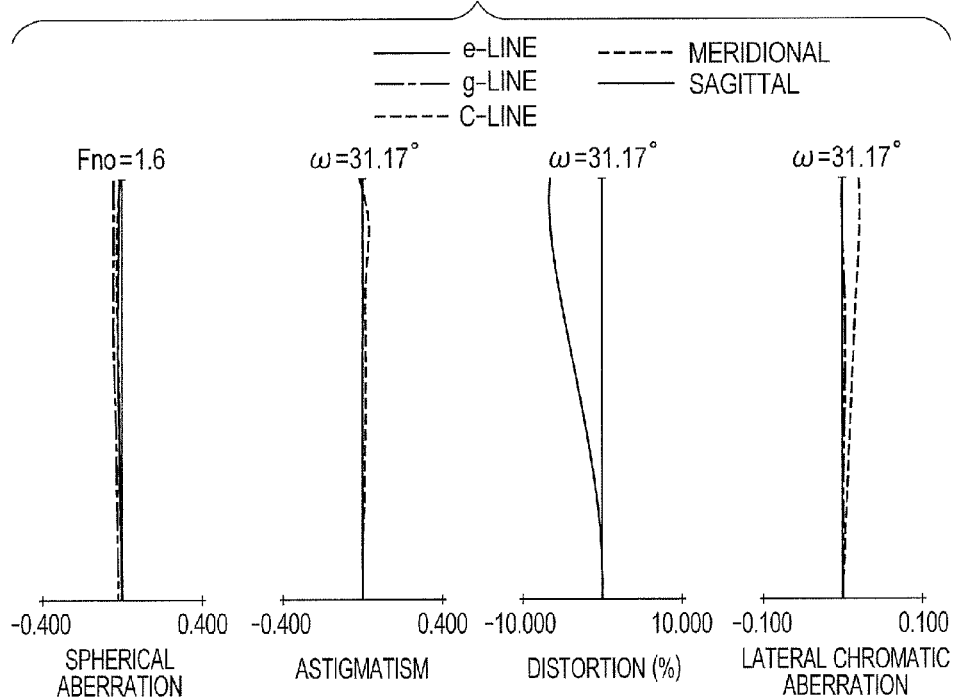
FIG. 16A is an aberration diagram when focused on the object at infinity at the wide angle end according to Numerical Embodiment 5.
Figure 16B:
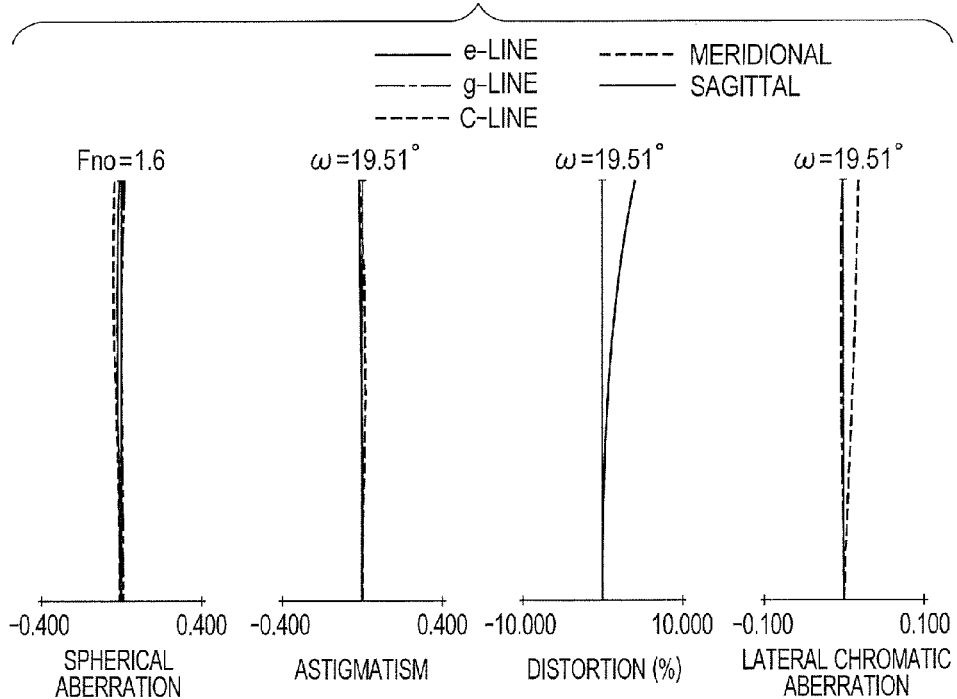
FIG. 16B is an aberration diagram when focused on the object at infinity at the zoom position z1 according to Numerical Embodiment 5.
Figure 16C:
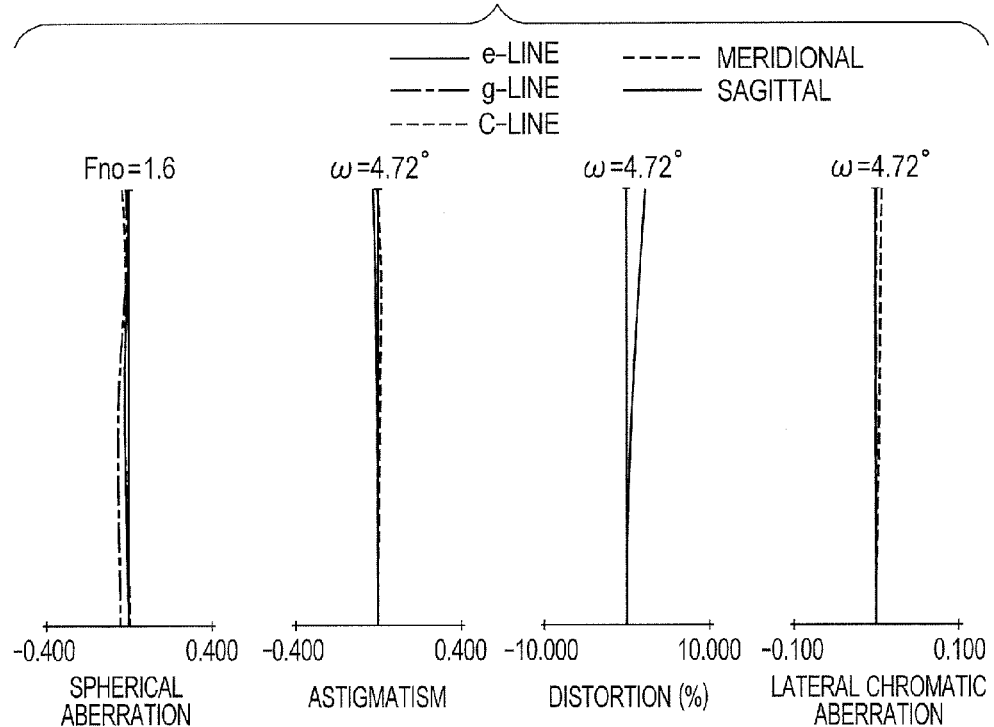
FIG. 16C is an aberration diagram when focused on the object at infinity at the zoom position z2 according to Numerical Embodiment 5.
Figure 16D:
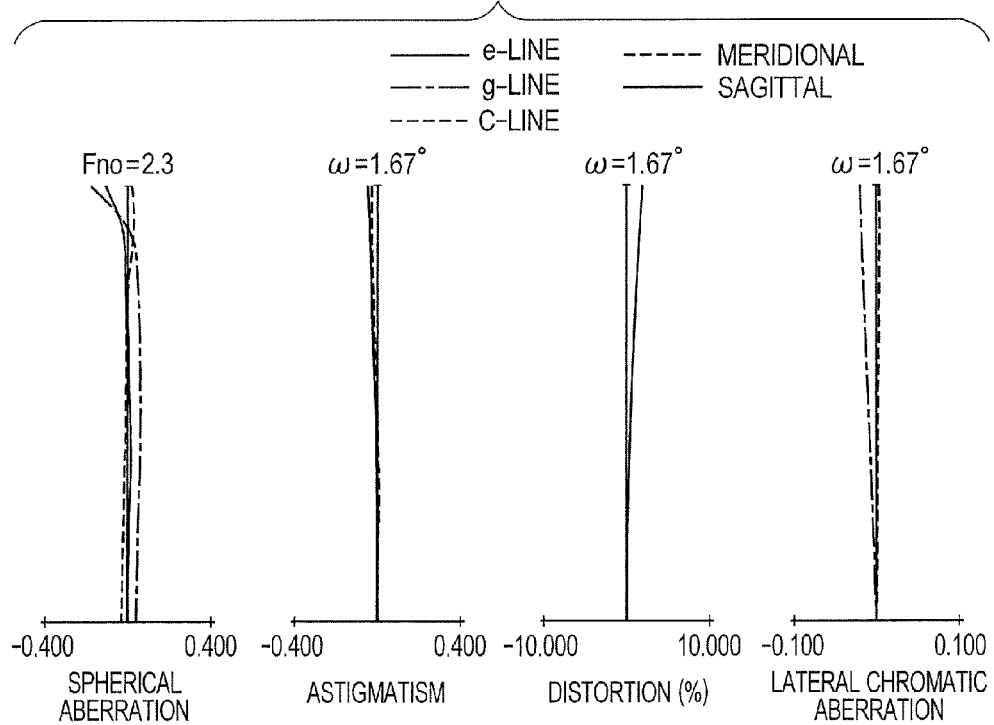
FIG. 16D is an aberration diagram when focused on the object at infinity at the telephoto end according to Numerical Embodiment 5.

FIG. 15 is a lens cross-sectional view of the zoom lens when focused on the object at infinity at the wide angle end (focal length f=6.75 mm) according to Embodiment 5 (Numerical Embodiment 5) of the present invention.

In Embodiment 5, the first lens unit U1 corresponds to the 1st to 19th lens surfaces. The second lens unit U2 corresponds to the 20th to 26th lens surfaces. The third lens unit U3 corresponds to the 27th to 33rd lens surfaces. The fourth lens unit U4 corresponds to the 34th to 37th lens surfaces.

During zooming from the wide angle end to the telephoto end, when the second lens unit U2 moves linearly to the image side, the third lens unit U3 substantially moves from the image side to the object side along a non-linear locus at the middle zoom position.

The second of the four zoom positions is the zoom position z1 (f=15.53 mm), and the lens diameter of the first lens unit U1 is determined near the focal length. The third is the zoom position z2 (f=66.57 mm), and the imaging magnification β2 of the second lens unit is −1. Near the focal length, the lens diameters of the third and fourth lens units U3 and U4 are determined.

The 20th, 28th, and 36th lens surfaces have aspherical shapes. The 20th lens surface mainly corrects a distortion on the wide angle side, and the 28th and 36th lens surfaces correct off-axial aberrations such as a coma on the wide angle side and the spherical aberration on the telephoto side.

FIGS. 16A to 16D are aberration diagrams when focused on the object at infinity at the wide angle end, the zoom position (focal length) z1 (f=15.53 mm), the zoom position (focal length) z2 (f=66.57 mm), and the telephoto end at which f=189.00 mm according to Numerical Embodiment 5, respectively.

As shown in Table 1 to be described later, Numerical Embodiment 5 satisfies all of Conditional Expressions (1) to (13). Thus, Embodiment 5 attains the high zoom ratio of 28 and an increase in angle of field with a photographing angle of field (angle of field) at the wide angle end of 78.35°. Moreover, high optical performance is provided with the aberrations being corrected satisfactorily over the entire zoom range.

Numerical Embodiment 5

Unit: mm
Surface data

| Surface number | r | d | nd | vd | θgF | Effective diameter | Focal length |
|---|---|---|---|---|---|---|---|
| 1 | 378.48165 | 5.35000 | 1.772499 | 49.60 | 0.5521 | 173.904 | −187.094 |
| 2 | 104.30474 | 48.15487 | | | | 146.481 | |
| 3 | −173.47322 | 4.40000 | 1.696797 | 55.53 | 0.5433 | 145.316 | −196.555 |
| 4 | 671.08887 | 0.09299 | | | | 147.557 | |
| 5 | 254.55301 | 10.80583 | 1.805181 | 25.42 | 0.6161 | 149.871 | 408.755 |
| 6 | 1068.64458 | 6.57913 | | | | 149.641 | |
| 7 | 7885.69945 | 19.25204 | 1.433870 | 95.10 | 0.5373 | 149.297 | 410.445 |
| 8 | −182.52731 | 0.09864 | | | | 149.114 | |
| 9 | −3663.98983 | 4.20000 | 1.720467 | 34.70 | 0.5834 | 141.093 | −319.066 |
| 10 | 247.17073 | 18.69132 | 1.496999 | 81.54 | 0.5374 | 137.025 | 298.379 |
| 11 | −364.03637 | 26.28305 | | | | 136.423 | |
| 12 | 690.30071 | 19.68226 | 1.433870 | 95.10 | 0.5373 | 144.884 | 378.469 |
| 13 | −214.30176 | 1.59065 | | | | 145.526 | |
| 14 | 167.28801 | 4.30000 | 1.755199 | 27.51 | 0.6103 | 145.009 | −491.750 |
| 15 | 114.35424 | 0.83582 | | | | 140.142 | |
| 16 | 117.62468 | 28.01647 | 1.496999 | 81.54 | 0.5374 | 140.143 | 227.201 |
| 17 | −2803.18358 | 0.08859 | | | | 139.297 | |
| 18 | 151.65937 | 14.73531 | 1.620411 | 60.29 | 0.5426 | 133.613 | 308.708 |
| 19 | 691.06916 | (Variable) | | | | 132.224 | |
| 20* | 556.45781 | 2.50000 | 1.772499 | 49.60 | 0.5521 | 53.422 | −61.232 |
| 21 | 43.70280 | 4.28305 | | | | 45.834 | |
| 22 | 64.47126 | 9.75889 | 1.808095 | 22.76 | 0.6307 | 44.558 | 41.845 |
| 23 | −67.72978 | 1.50000 | 1.754998 | 52.32 | 0.5476 | 42.877 | −39.310 |
| 24 | 53.76655 | 7.53861 | | | | 36.839 | |
| 25 | 42.51256 | 1.50000 | 1.882997 | 40.76 | 0.5667 | 36.830 | −68.641 |
| 26 | −142.79643 | (Variable) | | | | 38.522 | |
| 27 | 112.99500 | 7.64436 | 1.592400 | 68.30 | 0.5456 | 50.691 | 93.408 |
| 28* | −106.42637 | 0.09674 | | | | 50.932 | |
| 29 | 125.97027 | 8.85939 | 1.438750 | 94.93 | 0.5343 | 50.737 | 110.391 |
| 30 | −77.31383 | 0.49461 | | | | 50.430 | |
| 31 | −91.08900 | 1.90000 | 1.755199 | 27.51 | 0.6103 | 49.719 | −104.213 |
| 32 | 622.86364 | 5.76098 | 1.438750 | 94.93 | 0.5343 | 49.425 | 187.668 |
| 33 | −94.88868 | (Variable) | | | | 49.337 | |
| 34 | 1955.31277 | 2.00000 | 1.654115 | 39.70 | 0.5737 | 43.890 | −302.260 |
| 35 | 180.45807 | 0.49332 | | | | 43.272 | |
| 36* | 135.06046 | 5.25584 | 1.696797 | 55.53 | 0.5433 | 43.129 | 119.699 |
| 37 | −217.01028 | (Variable) | | | | 42.570 | |
| 38 (Stop) | ∞ | 2.67000 | | | | 27.734 | |
| 39 | −54.86213 | 1.50000 | 1.696797 | 55.53 | 0.5433 | 27.224 | −25.352 |
| 40 | 26.51461 | 6.24999 | 1.808095 | 22.76 | 0.6307 | 26.657 | 53.806 |
| 41 | 59.79807 | 13.14691 | | | | 26.041 | |
| 42 | −70.48387 | 1.50000 | 1.772499 | 49.60 | 0.5521 | 26.976 | −32.407 |
| 43 | 39.47781 | 10.23452 | 1.603420 | 38.03 | 0.5835 | 28.165 | 29.651 |
| 44 | −29.85502 | 0.19890 | | | | 29.415 | |
| 45 | −32.28082 | 1.60000 | 1.816000 | 46.62 | 0.5568 | 29.339 | −29.985 |
| 46 | 105.56305 | 13.27575 | 1.595509 | 39.24 | 0.5804 | 31.701 | 54.566 |
| 47 | 45.12427 | 2.99970 | | | | 35.694 | |
| 48 | −913.51893 | 5.46540 | 1.531717 | 48.84 | 0.5630 | 37.355 | 148.782 |
| 49 | −73.28323 | 0.19985 | | | | 37.925 | |
| 50 | 203.90821 | 2.00000 | 1.882997 | 40.76 | 0.5667 | 37.900 | −56.460 |
| 51 | 40.06134 | 9.17680 | 1.496999 | 81.54 | 0.5374 | 37.374 | 60.000 |
| 52 | −109.00000 | 0.81000 | | | | 37.843 | |
| 53 | 93.58960 | 8.76092 | 1.496999 | 81.54 | 0.5374 | 38.141 | 71.946 |
| 54 | −56.32992 | 2.00000 | 1.761821 | 26.52 | 0.6135 | 37.812 | −87.076 |
| 55 | −361.27717 | 0.20000 | | | | 37.957 | |
| 56 | 96.88656 | 8.64470 | 1.487490 | 70.23 | 0.5300 | 37.887 | 71.246 |
| 57 | −52.83203 | 10.00000 | | | | 37.389 | |
| 58 | ∞ | 33.00000 | 1.608590 | 46.44 | 0.5664 | 50.000 | 0.000 |
| 59 | ∞ | 13.20000 | 1.516330 | 64.15 | 0.5352 | 50.000 | 0.000 |
| 60 | ∞ | 15.10183 | | | | 50.000 | |
| Image plane | ∞ | | | | | | |

Aspherical surface data

Twentieth surface

K = −2.04859e+002   A4 = 6.64887e−007   A6 = −2.22325e−011   A8 = −1.47253e−013

Twenty-eighth surface

K = −1.67902e+000   A4 = 6.35831e−007   A6 = 1.31051e−011   A8 = 3.96102e−014

-continued

Thirty-sixth surface

K = 8.78418e+000    A4 = −5.94570e−007    A6 = −3.43946e−010    A8 = 7.66112e−014

Various data
Zoom ratio 28.00

| | | | | |
|---|---|---|---|---|
| Focal length | 6.75 | 15.53 | 66.57 | 189.00 |
| F-number | 1.60 | 1.60 | 1.60 | 2.30 |
| Half angle of field | 39.17 | 19.51 | 4.72 | 1.67 |
| Image height | 5.50 | 5.50 | 5.50 | 5.50 |
| Total lens length | 600.15 | 600.15 | 600.15 | 600.15 |
| d19 | 2.01 | 43.76 | 93.00 | 108.06 |
| d26 | 160.80 | 106.77 | 46.17 | 1.24 |
| d33 | 0.66 | 8.84 | 0.67 | 29.79 |
| d37 | 2.00 | 6.10 | 25.63 | 26.38 |
| Incident pupil position | 109.63 | 153.36 | 356.35 | 938.18 |
| Exit pupil position | 127.41 | 127.41 | 127.41 | 127.41 |
| Front principal point position | 116.79 | 171.03 | 462.38 | 1445.26 |
| Rear principal point position | 8.35 | −0.43 | −51.46 | −173.90 |

Zoom lens unit data

| Unit | First surface | Focal length | Lens structure length | Front principal point position | Rear principal point position |
|---|---|---|---|---|---|
| 1 | 1 | 103.29 | 213.16 | 126.42 | 58.54 |
| 2 | 20 | −28.75 | 27.08 | 11.34 | −7.13 |
| 3 | 27 | 65.94 | 24.76 | 5.30 | −11.92 |
| 4 | 34 | 196.50 | 7.75 | 3.90 | −0.90 |
| 5 | 38 | 33.61 | 146.83 | 47.00 | 9.38 |

Embodiment 6

The zoom lens according to Embodiment 6 also has a configuration similar to that of the zoom lens according to Embodiment 1.

Figure 17:
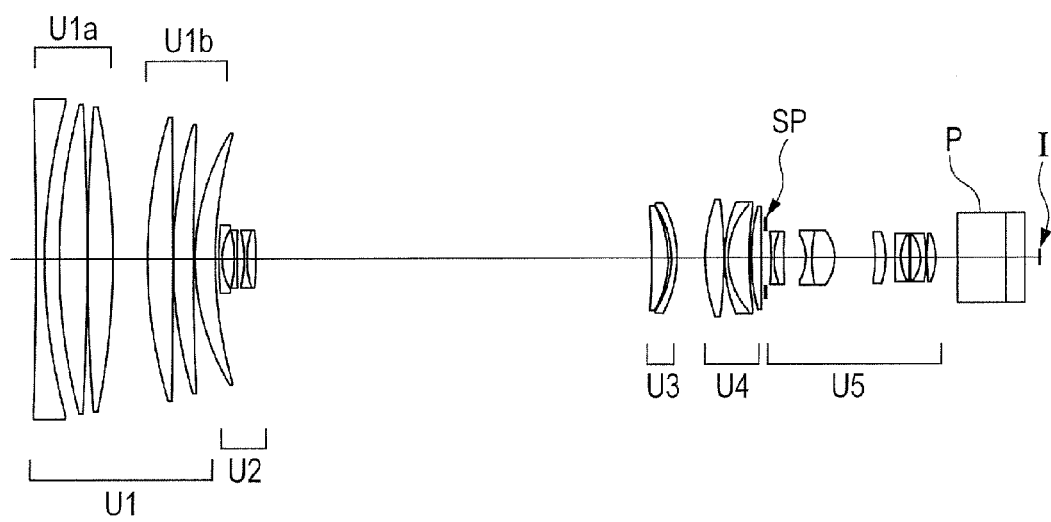
FIG. 17 is a lens cross-sectional view when focused on the object at infinity at the wide angle end according to Numerical Embodiment 6.

FIG. 17 is a lens cross-sectional view of the zoom lens when focused on the object at infinity at the wide angle end (focal length f=8.9 mm) according to Embodiment 6 (Numerical Embodiment 6) of the present invention.

In Embodiment 6, the first lens unit U1 corresponds to the 1st to 12th lens surfaces. The second lens unit U2 corresponds to the 13th to 19th lens surfaces. The third lens unit U3 corresponds to the 20th to 23rd lens surfaces. The fourth lens unit U4 corresponds to the 24th to 30th lens surfaces.

During zooming from the wide angle end to the telephoto end, when the second lens unit U2 moves linearly to the image side, the third lens unit U3 substantially moves from the image side to the object side along a non-linear locus at the middle zoom position.

The second of the four zoom positions is the zoom position z1 (f=27.41 mm), and the lens diameter of the first lens unit U1 is determined near the focal length. The third is the zoom position z2 (f=243.05 mm), and the imaging magnification β2 of the second lens unit is −1. Near the focal length, the lens diameters of the third and fourth lens units U3 and U4 are determined.

FIGS. 18A to 18D are aberration diagrams when focused on the object at infinity at the wide angle end, the zoom position (focal length) z1 (f=27.41 mm), the zoom position (focal length) z2 (f=243.05 mm), and the telephoto end at which f=801.00 mm according to Numerical Embodiment 6, respectively.

As shown in Table 1 to be described later, Numerical Embodiment 6 satisfies Conditional Expressions (1) to (4) and Conditional Expressions (6) to (13). Thus, Embodiment 6 attains the high zoom ratio of 90 and an increase in angle of field with a photographing angle of field (angle of field) at the wide angle end of 63.43°. Moreover, high optical performance is provided with the aberrations being corrected satisfactorily over the entire zoom range.

Numerical Embodiment 6

Unit: mm
Surface data

| Surface number | r | d | nd | vd | θgF | Effective diameter | Focal length |
|---|---|---|---|---|---|---|---|
| 1 | −3840.48133 | 6.00000 | 1.834000 | 37.16 | 0.5775 | 214.230 | −434.925 |
| 2 | 403.67229 | 9.89821 | | | | 207.669 | |
| 3 | 415.24185 | 19.09246 | 1.433870 | 95.10 | 0.5373 | 206.456 | 789.235 |
| 4 | −1953.41578 | 0.25000 | | | | 205.637 | |
| 5 | 1333.41693 | 17.19550 | 1.433870 | 95.10 | 0.5373 | 203.102 | 877.388 |
| 6 | −532.55646 | 23.59261 | | | | 202.314 | |
| 7 | 336.79425 | 17.31671 | 1.433870 | 95.10 | 0.5373 | 189.759 | 740.645 |
| 8 | −7293.94593 | 0.25000 | | | | 188.139 | |
| 9 | 321.37720 | 13.61893 | 1.433870 | 95.10 | 0.5373 | 179.391 | 889.214 |

-continued

| | | | | | | | |
|---|---|---|---|---|---|---|---|
| 10 | 1876.33483 | 1.20000 | | | | 178.277 | |
| 11 | 168.02303 | 13.65906 | 1.438750 | 94.93 | 0.5343 | 167.502 | 814.332 |
| 12 | 308.62327 | (Variable) | | | | 165.693 | |
| 13 | 352.11125 | 2.00000 | 1.882997 | 40.76 | 0.5667 | 44.881 | −50.578 |
| 14 | 39.73153 | 8.41426 | | | | 39.029 | |
| 15 | −83.78395 | 1.90000 | 1.816000 | 46.62 | 0.5568 | 38.233 | −86.579 |
| 16 | 470.48958 | 4.68482 | | | | 37.542 | |
| 17 | −87.16000 | 1.90000 | 1.882997 | 40.76 | 0.5667 | 37.042 | −40.491 |
| 18 | 61.84980 | 6.11891 | 1.959060 | 17.47 | 0.6597 | 37.671 | 52.367 |
| 19 | −273.32589 | (Variable) | | | | 37.825 | |
| 20 | −537.16487 | 11.28035 | 1.496999 | 81.54 | 0.5374 | 68.709 | 171.597 |
| 21 | −74.29980 | 2.08138 | | | | 70.208 | |
| 22 | −64.63738 | 4.00000 | 1.772499 | 49.60 | 0.5521 | 70.267 | −503.872 |
| 23 | −79.52886 | (Variable) | | | | 73.508 | |
| 24 | 118.20775 | 12.96189 | 1.595220 | 67.74 | 0.5442 | 78.604 | 143.680 |
| 25 | −300.41148 | 0.30000 | | | | 78.274 | |
| 26 | 97.31622 | 2.50000 | 1.805181 | 25.42 | 0.6161 | 75.086 | −153.673 |
| 27 | 54.06450 | 14.25979 | 1.438750 | 94.93 | 0.5343 | 70.718 | 153.419 |
| 28 | 250.00000 | 1.37579 | | | | 69.772 | |
| 29 | 140.17903 | 6.88080 | 1.595220 | 67.74 | 0.5442 | 68.929 | 234.681 |
| 30 | ∞ | (Variable) | | | | 68.022 | |
| 31 | ∞ | 3.96569 | | | | 36.558 | |
| 32 | −173.66465 | 1.80000 | 1.816000 | 46.62 | 0.5568 | 34.777 | −46.072 |
| 33 | 48.52009 | 6.62831 | 1.808095 | 22.76 | 0.6307 | 33.578 | 66.615 |
| 34 | 422.18953 | 15.12736 | | | | 32.747 | |
| 35 | −30.24187 | 4.00000 | 1.816000 | 46.62 | 0.5568 | 29.207 | −26.240 |
| 36 | 79.08126 | 15.65493 | 1.548141 | 45.79 | 0.5685 | 32.229 | 41.506 |
| 37 | −29.91087 | 27.64508 | | | | 35.913 | |
| 38 | −90.58133 | 7.38653 | 1.487490 | 70.23 | 0.5300 | 33.561 | 221.927 |
| 39 | −50.70117 | 6.06918 | | | | 34.010 | |
| 40 | 208.40845 | 4.00000 | 1.834000 | 37.16 | 0.5775 | 31.669 | −43.820 |
| 41 | 30.98826 | 6.02036 | 1.487490 | 70.23 | 0.5300 | 30.191 | 55.067 |
| 42 | −192.83598 | 0.66686 | | | | 30.202 | |
| 43 | 462.30374 | 6.74306 | 1.517417 | 52.43 | 0.5564 | 30.103 | 46.175 |
| 44 | −25.18820 | 4.00000 | 1.882997 | 40.76 | 0.5667 | 30.001 | −43.018 |
| 45 | −79.44703 | 0.39662 | | | | 31.685 | |
| 46 | 123.45357 | 5.90802 | 1.517417 | 52.43 | 0.5564 | 31.905 | 59.284 |
| 47 | −40.39048 | 15.00000 | | | | 31.839 | |
| 48 | ∞ | 33.00000 | 1.608590 | 46.44 | 0.5664 | 60.000 | 0.000 |
| 49 | ∞ | 13.20000 | 1.516330 | 64.15 | 0.5352 | 60.000 | 0.000 |
| 50 | ∞ | 9.97627 | | | | 60.000 | |
| Image plane | ∞ | | | | | | |

Various data
Zoom ratio 90.00

| | | | | |
|---|---|---|---|---|
| Focal length | 8.90 | 27.41 | 243.05 | 801.00 |
| F-number | 1.85 | 1.85 | 1.85 | 4.50 |
| Half angle of field | 31.72 | 11.35 | 1.30 | 0.39 |
| Image height | 5.50 | 5.50 | 5.50 | 5.50 |
| Total lens length | 684.45 | 684.45 | 684.45 | 684.45 |
| d12 | 2.63 | 103.91 | 178.71 | 192.28 |
| d19 | 269.77 | 174.75 | 63.25 | 4.80 |
| d23 | 19.12 | 2.13 | 1.54 | 9.31 |
| d30 | 3.00 | 13.73 | 51.02 | 88.14 |
| Incident pupil position | 131.20 | 432.17 | 2288.20 | 8438.66 |
| Exit pupil position | 129.62 | 129.62 | 129.62 | 129.62 |
| Front principal point position | 140.76 | 465.86 | 3025.03 | 14602.36 |
| Rear principal point position | 1.08 | −17.43 | −233.08 | −791.02 |

Zoom lens unit data

| Unit | First surface | Focal length | Lens structure length | Front principal point position | Rear principal point position |
|---|---|---|---|---|---|
| 1 | 1 | 248.81 | 122.07 | 74.99 | −14.54 |
| 2 | 13 | −25.22 | 25.02 | 5.10 | −13.60 |
| 3 | 20 | 268.45 | 17.36 | 14.10 | 2.32 |
| 4 | 24 | 94.47 | 38.28 | 7.00 | −19.18 |
| 5 | 31 | 43.17 | 177.21 | 67.98 | 11.30 |

TABLE 1

Table 1: Values corresponding to the conditional expressions in Numerical Embodiments 1 to 6

|  |  | Numerical Embodiment | | | | | |
| --- | --- | --- | --- | --- | --- | --- | --- |
|  |  | 1 | 2 | 3 | 4 | 5 | 6 |
| Focal | Wide angle end | 8.80 | 9.00 | 8.90 | 8.90 | 6.75 | 8.90 |
| length | fz1 | 28.50 | 28.46 | 29.15 | 29.46 | 15.53 | 27.41 |
|  | fz2 | 275.82 | 249.84 | 239.84 | 251.97 | 66.57 | 243.05 |
|  | Telephoto end | 968.0 | 899.98 | 1023.50 | 1068.00 | 189.00 | 801.00 |
| Zoom magnification |  | 110.00 | 100.00 | 115.00 | 120.00 | 28.00 | 90.00 |
| $Z^{0.25}$ |  | 3.24 | 3.16 | 3.27 | 3.31 | 2.30 | 3.08 |
| f1 |  | 257.97 | 268.44 | 260.74 | 255.48 | 103.29 | 248.81 |
| f2 |  | −25.58 | −24.98 | −26.63 | −24.37 | −28.75 | −25.22 |
| f3 |  | 79.74 | 115.10 | 77.31 | 91.75 | 65.94 | 268.45 |
| f4 |  | 253.64 | 121.89 | 240.15 | 182.76 | 196.50 | 94.47 |
| β2w |  | −0.12 | −0.12 | −0.13 | −0.12 | −0.24 | −0.13 |
| β2z2 |  | −1.00 | −1.00 | −1.00 | −1.00 | −1.00 | −1.00 |
| β2t |  | −2.49 | −2.32 | −3.40 | −3.10 | −2.10 | −2.16 |
| β3w |  | −0.32 | −0.61 | −0.31 | −0.40 | −0.46 | −4.68 |
| β3z2 |  | −1.59 | −16.15 | −1.37 | −2.34 | −1.31 | 2.11 |
| β3t |  | −2.44 | 6.50 | −1.38 | −3.95 | −1.79 | 1.72 |
| β4w |  | 0.75 | 0.48 | 0.75 | 0.67 | 0.71 | 0.06 |
| β4z2 |  | 0.58 | 0.06 | 0.60 | 0.39 | 0.59 | −0.45 |
| β4t |  | 0.53 | −0.23 | 0.75 | 0.32 | 0.59 | −0.84 |
| β2wt |  | 20.12 | 19.86 | 26.07 | 25.83 | 8.75 | 17.24 |
| β34wt |  | 5.47 | 5.04 | 4.41 | 4.65 | 3.20 | 5.22 |
| f34w |  | 64.40 | 76.52 | 62.47 | 71.14 | 52.68 | 74.78 |
| f34z1 |  | 67.31 | 74.29 | 64.15 | 70.23 | 54.49 | 71.22 |

| Conditional |  | Numerical Embodiment | | | | | |
| --- | --- | --- | --- | --- | --- | --- | --- |
| Expression |  | 1 | 2 | 3 | 4 | 5 | 6 |
| (1) | νp − νn | 24.96 | 43.96 | 27.03 | 26.29 | 15.83 | 51.38 |
| (2) | β2w | −0.12 | −0.12 | −0.13 | −0.12 | −0.24 | −0.13 |
| (3) | β2t | −2.49 | −2.32 | −3.40 | −3.10 | −2.10 | −2.16 |
| (4) | β34z2 | −0.91 | −0.95 | −0.82 | −0.91 | −0.78 | −0.95 |
| (5) | f3/f4 | 0.31 | 0.94 | 0.32 | 0.50 | 0.34 | 2.84 |
| (6) | (R41 + R42)/(R41 − R42) | 2.92 | 6.46 | 3.63 | 4.22 | 1.20 | 3.50 |
| (7) | (θ2p − θ2n)/(ν2p − ν2n) | −3.76E−03 | −4.41E−03 | −4.60E−03 | −4.22E−03 | −3.03E−03 | −3.82E−03 |
| (8) | (θ3p − θ3n)/(ν3p − ν3n) | −1.46E−03 | −1.50E−03 | −1.44E−03 | −1.57E−03 | −1.23E−03 | −4.58E−04 |
| (9) | (θ4p − θ4n)/(ν4p − ν4n) | −1.57E−03 | −1.73E−03 | −2.17E−03 | −1.80E−03 | −1.92E−03 | −1.46E−03 |
| (10) | f34w/f34z1 | 0.96 | 1.03 | 0.97 | 1.01 | 0.97 | 1.05 |
| (11) | |ft/f1| | 3.75 | 3.35 | 3.93 | 4.18 | 1.83 | 3.22 |
| (12) | |f1/f2| | 10.08 | 10.75 | 9.79 | 10.48 | 3.59 | 9.87 |
| (13) | β2wt/β24wt | 3.68 | 3.94 | 5.91 | 5.56 | 2.73 | 3.30 |

"E-Z" means "×10$^{-Z}$".

As described above, according to the zoom lens of the present invention, the refractive power arrangement of each lens unit, the loci of movement of the moving lens units for zooming, and the like are appropriately defined. This allows both the increase in zoom ratio and the increase in angle of field to be attained, and allows the zoom lens in which the aberrations are corrected satisfactorily to be provided.

Embodiment 7

Figure 19:
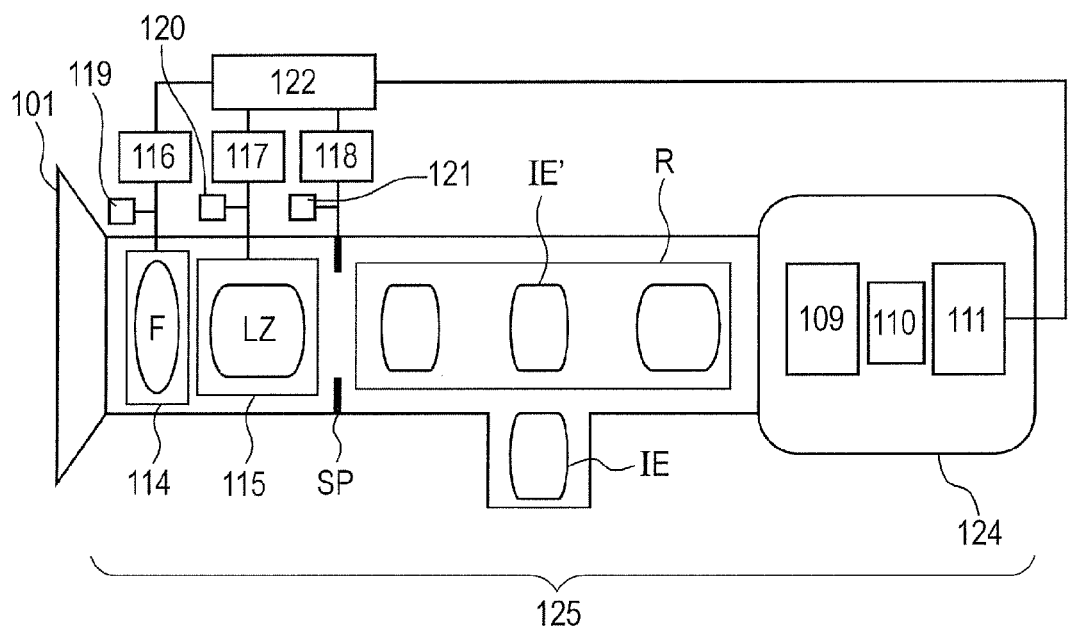
FIG. 19 is a schematic diagram of a main part of an image pickup apparatus according to the present invention.

FIG. 19 is a schematic diagram of a main part of an image pickup apparatus (television camera system) using the zoom lens according to each of Embodiments 1 to 6 of the present invention as a photographing optical system. In FIG. 19, an image pickup apparatus 125 includes a zoom lens 101 according to any one of Embodiments 1 to 6, and a camera 124. The zoom lens 101 is removably attached to the camera 124. The camera 124 attached with the zoom lens 101 constitutes the image pickup apparatus 125. The zoom lens 101 includes a first lens unit U1F, a zooming portion LZ, and a fourth lens unit U4R for imaging. The first lens unit U1F includes a lens unit for focusing.

The zooming portion LZ includes the second lens unit U2 which moves on the optical axis for zooming, and the third lens unit U3 and the fourth lens unit U4 which move on the optical axis for correcting the image plane variation accompanying the zooming. The aperture stop is denoted by SP. The fourth lens unit U4R includes lens units IE' and IE which can be inserted into and removed from an optical path. The lens units IE and IE' are switched to displace the focal length range of the entire system of the zoom lens 101. Drive mechanisms 114 and 115, such as a helicoid and a cam, drive the first lens unit U1F and the zooming portion LZ in an optical axis direction, respectively.

Motors (drive units) 116 to 118 electrically drive the drive mechanisms 114 and 115 and the aperture stop SP. Detectors 119 to 121, such as an encoder, a potentiometer, or a photosensor, are configured to detect the positions of the first lens unit U1F and the zooming portion LZ on the optical axis, and the aperture diameter of the aperture stop SP. The camera 124 includes a glass block 109, which corresponds to an optical filter or a color separation optical system provided within the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101.

Further, central processing units (CPUs) 111 and 122 control the driving of the camera 124 and the zoom lens 101. By applying the zoom lens according to the present invention to a television camera as described above, an image pickup apparatus having a high optical performance may be realized.

The exemplary embodiments of the present invention are described above. However, it goes without saying that the present invention is not limited to these embodiments and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-180899, filed Aug. 17, 2012, which is hereby incorporated by reference herein in its entirety.

What is claimed is:

1. A zoom lens comprising, in order from an object side to an image side:
a first lens unit having a positive refractive power which does not move for zooming;
a second lens unit having a negative refractive power which moves during zooming;
a third lens unit having the positive refractive power which moves during zooming;
a fourth lens unit having the positive refractive power which moves during zooming; and
a fifth lens unit having the positive refractive power which does not move for zooming,
wherein each of the first lens unit to the fifth lens unit includes at least one positive lens and at least one negative lens, and
wherein the following conditional expressions are satisfied:

$$-10 < \nu p - \nu n < 54;$$

$$-1 < \beta 2w < -0.05;$$

$$-5 < \beta 2t < -1;$$

and $$-1 < \beta 34z2 < -0.3,$$

where $\nu p$ is an average Abbe constant of the at least one positive lens of the fourth lens unit, $\nu n$ is an average Abbe constant of the at least one negative lens of the fourth lens unit, $\beta 2w$ is an imaging magnification of the second lens unit at a wide angle end, $\beta 2t$ is an imaging magnification of the second lens unit at a telephoto end, and $\beta 34z2$ is an imaging magnification of a combined lens unit including the third lens unit and the fourth lens unit at a zoom position z2 where the imaging magnification of the second lens unit is −1.

2. The zoom lens according to claim 1, wherein:
the third lens unit passes through a point where the imaging magnification is −1 during zooming from the wide angle end to the telephoto end, and
the following conditional expression is satisfied:

$$0.1 < f3/f4 < 1.0,$$

where f3 is a focal length of the third lens unit, and f4 is a focal length of the fourth lens unit.

3. The zoom lens according to claim 1, wherein the following conditional expression is satisfied:

$$0.5 < (R41+R42)/(R41-R42) < 10,$$

where R41 is a radius of curvature of a surface on the object side of a negative lens at an end on the object side of the fourth lens unit, and R42 is a radius of curvature of a surface on the image side of the negative lens at the end on the object side of the fourth lens unit.

4. The zoom lens according to of claim 1, wherein the following conditional expression is satisfied:

$$-5.5 \times 10^{-3} < (\theta 2p - \theta 2n)/(\nu 2p - \nu 2n) < -2.0 \times 10^{-3},$$

where $\nu 2p$ is an average value of an Abbe constant of the at least one positive lens of the second lens unit, $\theta 2p$ is an average value of a partial dispersion value of the at least one positive lens of the second lens unit, $\nu 2n$ is an average value of an Abbe constant of the at least one negative lens of the second lens unit, and $\theta 2n$ is an average value of a partial dispersion ratio of the at least one negative lens of the second lens unit.

5. The zoom lens according to of claim 1, wherein the following conditional expressions are satisfied:

$$-2.5 \times 10^{-3} < (\theta 3p - \theta 3n)/(\nu 3p - \nu 3n) < -2.0 \times 10^{-4},$$

and $$-3.5 \times 10^{-3} < (\theta 4p - \theta 4n)/(\nu 4p - \nu 4n) < -5.0 \times 10^{-4},$$

where $\nu 3p$ is an average value of an Abbe constant of the at least one positive lens of the third lens unit, $\theta 3p$ is an average value of a partial dispersion value of the at least one positive lens of the third lens unit, $\nu 3n$ is an average value of an Abbe constant of the at least one negative lens of the third lens unit, $\theta 3n$ is an average value of a partial dispersion ratio of the at least one negative lens of the third lens unit, $\nu 4p$ is an average value of an Abbe constant of the at least one positive lens of the fourth lens unit, $\theta 4p$ is an average value of a partial dispersion ratio of the at least one positive lens of the fourth lens unit, $\nu 4n$ is an average value of an Abbe constant of the at least one negative lens of the fourth lens unit, and $\theta 4n$ is an average value of a partial dispersion ratio of the at least one negative lens of the fourth lens unit.

6. The zoom lens according to of claim 1, wherein the following conditional expression is satisfied:

$$0.5 < f34w/f34z1 < 1.06,$$

where f34w is a combined focal length of the third lens unit and the fourth lens unit at the wide angle end, and f34z1 is a combined focal length of the third lens unit and the fourth lens unit at a zoom position z1 having a zoom ratio of $z^{0.25}$, z being a zoom ratio of the zoom lens.

7. The zoom lens according to of claim 1, wherein the following conditional expressions are satisfied:

$$1.5 < |ft/f1| < 5.0;$$

and $$3.0 < |f1/f2| < 15.0,$$

where f1 is a focal length of the first lens unit, f2 is a focal length of the second lens unit, and ft is a focal length of an entire system at the telephoto end.

8. The zoom lens according to of claim 1, wherein the following conditional expression is satisfied:

$$2.0 < \beta 2wt/\beta 34wt < 7.0,$$

where β2wt is a ratio of lateral magnifications at the wide angle end and the telephoto end of the second lens unit, and β34wt is a ratio of lateral magnifications at the wide angle end and the telephoto end of the combined lens unit including the third lens unit and the fourth lens unit.

9. The zoom lens according to claim 1, wherein:
at least one surface of the fourth lens unit is an aspherical surface,
when a surface having the positive refractive power is the aspherical surface, the surface has a shape in which the positive refractive power is reduced from an optical axis to a periphery, and
when a surface having the negative refractive power is the aspherical surface, the surface has a shape in which the negative refractive power is increased from the optical axis to the periphery.

10. An image pickup apparatus comprising:
a zoom lens comprising, in order from an object side to an image side:
 a first lens unit having a positive refractive power which does not move for zooming;
 a second lens unit having a negative refractive power which moves during zooming;
 a third lens unit having the positive refractive power which moves during zooming;
 a fourth lens unit having the positive refractive power which moves during zooming; and
 a fifth lens unit having the positive refractive power which does not move for zooming,
wherein each of the first lens unit to the fifth lens unit includes at least one positive lens and at least one negative lens, and
wherein the following conditional expressions are satisfied:

$$10 < \nu p - \nu n < 54;$$

$$-1 < \beta 2w < -0.05;$$

$$-5 < \beta 2t < -1;$$

and $$-1 < \beta 34z2 < -0.3,$$

where νp is an average Abbe constant of the at least one positive lens of the fourth lens unit, νn is an average Abbe constant of the at least one negative lens of the fourth lens unit, β2w is an imaging magnification of the second lens unit at a wide angle end, β2t is an imaging magnification of the second lens unit at a telephoto end, and β34z2 is an imaging magnification of a combined lens unit including the third lens unit and the fourth lens unit at a zoom position z2 where the imaging magnification of the second lens unit is −1; and
a solid-state image pickup element for receiving an image formed by the zoom lens.

* * * * *